United States Patent
Maeda et al.

(10) Patent No.: US 6,883,924 B2
(45) Date of Patent: Apr. 26, 2005

(54) LIGHTING APPARATUS AND LIQUID CRYSTAL DISPLAY

(75) Inventors: Satoshi Maeda, Kawasaki (JP); Hirokazu Aritake, Kawasaki (JP); Takao Satake, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 18 days.

(21) Appl. No.: 10/092,167

(22) Filed: Mar. 6, 2002

(65) Prior Publication Data

US 2003/0058632 A1 Mar. 27, 2003

(30) Foreign Application Priority Data

Aug. 31, 2001 (JP) ........................................ 2001-263922

(51) Int. Cl.[7] ................................................. F21V 7/04
(52) U.S. Cl. .............................. 362/31; 362/27; 362/26; 362/551; 362/555; 362/560; 362/561
(58) Field of Search ............................. 362/31, 27, 26, 362/551, 555, 558, 560, 561

(56) References Cited

U.S. PATENT DOCUMENTS

| | | | |
|---|---|---|---|
| 5,664,862 A | 9/1997 | Redmond et al. ............. 362/31 |
| 5,894,539 A | * 4/1999 | Epstein ....................... 385/133 |
| 5,980,054 A | * 11/1999 | Fukui et al. ................. 362/31 |
| 6,283,602 B1 | * 9/2001 | Kawaguchi et al. .......... 362/31 |
| 6,293,683 B1 | 9/2001 | Okada .......................... 362/31 |
| 2001/0017773 A1 | 8/2001 | Suzuki et al. ................. 362/26 |

FOREIGN PATENT DOCUMENTS

| | | |
|---|---|---|
| CN | 2358336 Y | 1/2000 |
| EP | 866 264 | 9/1998 |
| EP | 969 311 | 1/2000 |
| JP | 2000-011723 | 1/2000 |
| JP | 2001-35227 | 2/2001 |

* cited by examiner

*Primary Examiner*—Stephen Husar
*Assistant Examiner*—Bertrand Zeade
(74) *Attorney, Agent, or Firm*—Greer, Burns & Crain, Ltd.

(57) ABSTRACT

A lighting apparatus 10 comprising light sources 12a, 12b for emitting light, a plurality of light reflection portions 20 formed on the reflection side for reflecting light incident from the light sources, and a linear photoconductor 14 for causing the light to exit from the exit side opposed to the reflection side, the planes of the plurality of reflection portions being respectively tilted at angles which converge the light to the human eyes watching. Angles of the light reflection portions are set so that exit angles of light exiting from the linear photoconductor are required angles, whereby the lighting apparatus can have a uniform light intensity distribution. The application of the lighting apparatus can provide a liquid crystal display of good display characteristics.

28 Claims, 33 Drawing Sheets

LIGHTING APPARATUS AND LIQUID CRYSTAL DISPLAY

BACKGROUND OF THE INVENTION

The present invention relates to a lighting apparatus and a liquid crystal display, more specifically to a lighting apparatus which can light with a uniform light intensity, and a liquid crystal display using the lighting apparatus.

Liquid crystal panels, which are thin and light, are widely used as display screens of portable information terminals.

The liquid crystal panels contain transmission type liquid crystal panels and reflection type liquid crystal panels.

FIG. 28A is a sectional view of the transmission type liquid crystal panel. As shown in FIG. 28A, a deflector 214 is sandwiched between a glass substrate 210 and a glass substrate 212. Bus lines 216, etc. are formed on the glass substrate 212. Liquid crystal 220 is sealed between the glass substrate 212 and the glass substrate 218. A color filters 224a, 224b, 224c are sandwiched between the glass substrate 218 and the glass substrate 222. A deflector 228 is sandwiched between the glass substrate 222 and the glass substrate 226.

FIG. 28B is a sectional view of the reflection type liquid crystal panel. As shown in FIG. 28B, the reflection type liquid panel has a mirror 230 sandwiched between a glass substrate 210 and a glass substrate 212. The mirror 230 reflects light introduced from above the upper surface of the reflection type liquid crystal panel.

Liquid crystal itself, which does not emit light, needs lighting to visually recognize information on the liquid crystal panels.

In the transmission type crystal liquid panel, the lighting apparatus is disposed below the liquid crystal panel.

In the reflection type liquid crystal panel, in visually recognizing the display screen in circumstances where light, such as sunlight, room lights, are present, the lighting apparatus is not essential. However, the lighting apparatus is necessary to enable the visual recognition also in circumstances where no light is present. In the reflection type liquid crystal panel, the lighting apparatus is disposed above the liquid crystal panel.

FIG. 29 is a perspective view of a proposed lighting apparatus. As shown in FIG. 29, the proposed lighting apparatus includes LEDs 112a, 112b which emit light, a linear photoconductor 114 which transforms light from the LEDs 112a, 112b to linear light and emits the linear light, and a plane photoconductor 116 which transforms the linear light from the linear photoconductor 114 to plane light and emits the plane light. A plurality of light reflection portions 120 are formed in stripes on the back side, i.e., the reflection side of the linear photoconductor 114. A reflection coat film 118 is formed on the reflection side of the linear photoconductor 114.

FIGS. 30A and 30B are a perspective view and a plan view, respectively, of the linear photoconductor of the proposed lighting apparatus. As shown in FIGS. 30A and 30B, light emitted by the LEDs 112a, 112b is reflected on the light reflection portions 120 formed on the back side, i.e., the reflection side of the linear photoconductor 114. The light linearly emitted from the emission side of the linear photoconductor 114 is transformed to plane light by the plane photoconductor 116 and emitted from the plane of the plane photoconductor 116.

Such proposed lighting apparatus can light the liquid crystal panel in plane.

Such proposed lighting apparatus is described in the specification of Japanese Patent Laid-Open Publication No. Hei 10-260405/1998.

However, the above-described proposed lighting apparatus cannot light the liquid crystal panel 108 with a uniform intensity as will be described below.

FIG. 31 is a diagrammatic view showing relationships between the human eye and the display screen. When the display screen of the liquid crystal panel 108 having a 2 inch (5.08 cm)-screen size is visible at a 350 mm-distant position, light forming 0 degrees to the center of the display screen arrives at the eye, and light forming ±3 degrees to both ends of the display screen reaches the eye.

As shown in FIG. 32, in the proposed lighting apparatus, the intensity distribution of light emitted from the linear photoconductor 114 is not uniform and has high light intensities and low light intensities. An intensity distribution of the light emitted from the linear photoconductor 114 is reflected on an intensity distribution of the light emitted from the plane photoconductor 116. The intensity distribution of the light emitted from the plane photoconductor 116 is not accordingly uniform and has high light intensities and low light intensities. Accordingly, a liquid crystal display using the proposed lighting apparatus cannot have good display characteristics.

As shown in FIG. 32, in the proposed lighting apparatus, the intensity distribution of light emitted from the linear photoconductor 114 is not uniform and has high light intensities and low light intensities. An intensity distribution of the light emitted from the linear photoconductor 114 is reflected on an intensity distribution of the light emitted from the plane photoconductor 116. The intensity distribution of the light emitted from the plane photoconductor 116 does not accordingly uniform and has high light intensities and low light intensities. Accordingly, a liquid crystal display using the proposed lighting apparatus cannot have good display characteristics.

SUMMARY OF THE INVENTION

An object of the present invention is to provide a lighting apparatus which can light with a uniform light intensity, and a liquid crystal display having good display characteristics.

According to one aspect of the present invention, there is provided a lighting apparatus comprising a light source for emitting light, and a linear photoconductor for reflecting the light incident on a plurality of light reflection portions formed on a reflection side from the light source, and causing the light to exit linearly from an exit side opposed to the reflection side, lanes of the plurality of light reflection portions being tilted at angles which converge the light to the human eyes watching.

According to another aspect of the present invention, there is provided a lighting apparatus comprising a light source for emitting light, and a linear photoconductor for reflecting the light incident on a plurality of light reflection portions formed on a reflection side from the light source, and causing the light to exit linearly from an exit side opposed to the reflection side, planes of the plural light reflection portions are respectively tilted so that the light exit substantially vertically to the longitudinal direction of the linear photoconductor.

According to farther another aspect of the present invention, there is provided a liquid crystal display comprising a lighting apparatus including a light source for emitting light, a linear photoconductor for reflecting light incident on a plurality of light reflection portions formed on the reflection side from the light source and causing the light to exit linearly from the exit side opposed to the reflection side, and a surface photoconductor optically coupled to the linear photoconductor and causing the light entering from the linear photoconductor to exit in plane; and a liquid crystal panel illuminated by the lighting apparatus, planes of the plural light reflection portions being tilted at an angle which converges the light to the human eyes watching.

According to farther another aspect of the present invention, there is provided a liquid crystal display comprising a lighting apparatus including a light source for emitting light, a linear photoconductor for reflecting light incident on a plurality of light reflection portions formed on the reflection side from the light source and causing the light to exit linearly from the exit side opposed to the reflection side, and a surface photoconductor optically coupled to the linear photoconductor and causing the light entering from the linear photoconductor to exit in plane; and a liquid crystal panel illuminated by the lighting apparatus, planes of the plural light reflection portions being respectively tilted angles which cause the light to exit substantially vertically to the longitudinal direction of the linear photoconductor.

As described above, according to the present invention, angles of the light reflection portions are set so that exit angles of light exiting from the linear photoconductor are required angles, whereby the lighting apparatus can have a uniform light intensity distribution. The application of the lighting apparatus can provide a liquid crystal display of good display characteristics.

DETAILED DESCRIPTION OF THE INVENTION

[Principle of the Invention]

Before the lighting apparatus according to a first embodiment of the present invention is explained, the principle of the present invention will be explained.

The inventors of the present invention have made earnest studies for reasons why the proposed lighting apparatus is unable to light a liquid crystal panel with a uniform light intensity.

Figure 33:
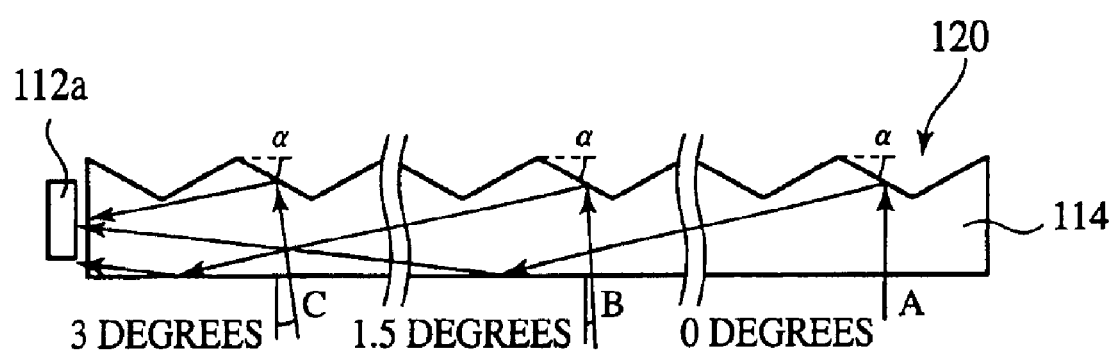
FIG. 33 is a plan view of the proposed lighting apparatus.

FIG. 33 is a plan view of the proposed light apparatus.

Light exiting at a 0 degrees exit angle from the planes of light reflection portions 120 formed at the position A which is the center of a linear photoconductor 114 was traced back, and the traces of the light reached substantially the center of the LED 112a.

Light exiting at, e.g., a 3 degrees exit angle from the planes of light reflection portions 120 formed at the position C which is near the left end of the linear photoconductor 114 was traced back, and the traces of the light reached substantially the center of the LED 112a. An emission angle of the traced back light was 3 degrees, because when the human eyes watch a 2 inch (5.08 cm)-liquid crystal panel at a position distant from the display screen by 350 mm, the light arriving at the human eyes has an about 3 degrees exit angle.

Light exiting at, e.g., a 1.5 degrees exit angle from the planes of the light reflection portions 120 formed at the position B which is the intermediate between the positions A and C was traced back, and the traces of the light reached a position offset from the center of the LED 112a.

The about 0 degrees-exit angle light exiting from the position A was studied about the light intensity. The intensity of the exiting light was high. The about 3 degrees-exit angle light exiting from the position C was studied about the light intensity. The intensity of the exiting light was high. The about 1.5 degrees-exit angle light exiting from the position B was studied about the intensity. The intensity of the exiting light was low.

Based on the above, it has been found that when light exits at an angle as an exit angle, which permits the light to arrive at the human eyes, and traces of the light given by the back-tracing reaches substantially the center of the LED, intensities of the light, which can arrive at the human eyes, are high, and when light exits at an angle as an exit angle, which permits the light to arrive at the human eyes, and traces of the light given by the back-tracing are offset from the center of the LED, intensities of the light, which can arrive at the human eyes, are low.

Based on the above-described studies, the inventors of the present application have had an idea that tilt angles of the light reflection portions are respectively set so that an exit angle of light is an angle which permits the light to arrive at the human eyes, and traces of the light given by tracing back the light reach substantially the center of the LED, whereby the light is converged to the human eyes watching, and a uniform light intensity distribution can be obtained.

[A First Embodiment]

Figure 1A:
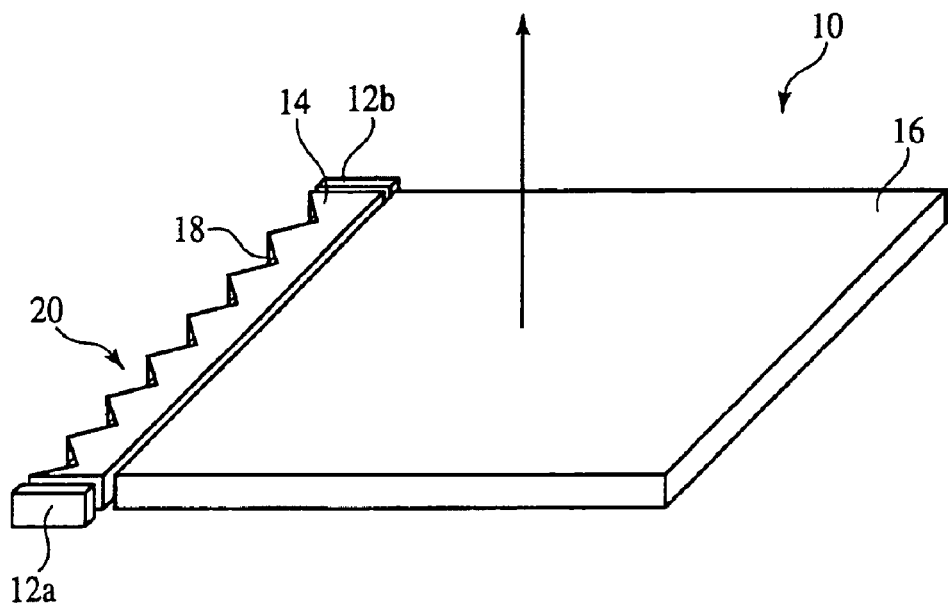
FIG. 1A is a perspective view of the lighting apparatus according to a first embodiment of the present invention.
Figure 1B:
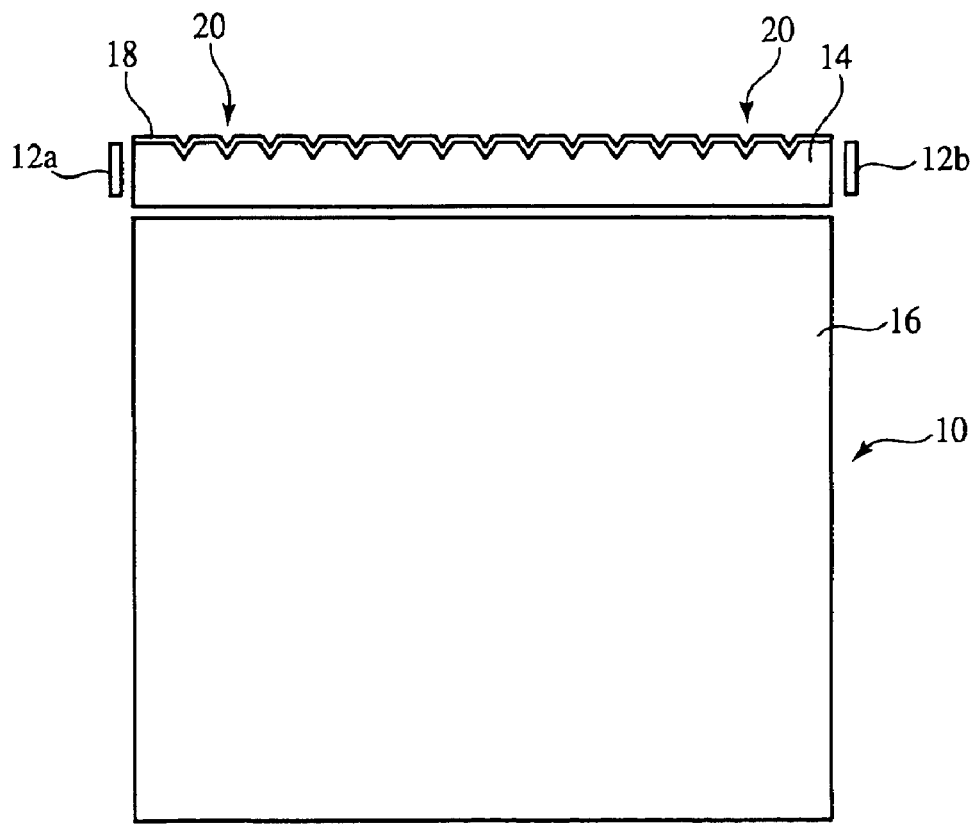
FIG. 1B is a plan view of the lighting apparatus according to a first embodiment of the present invention.
Figure 2A:
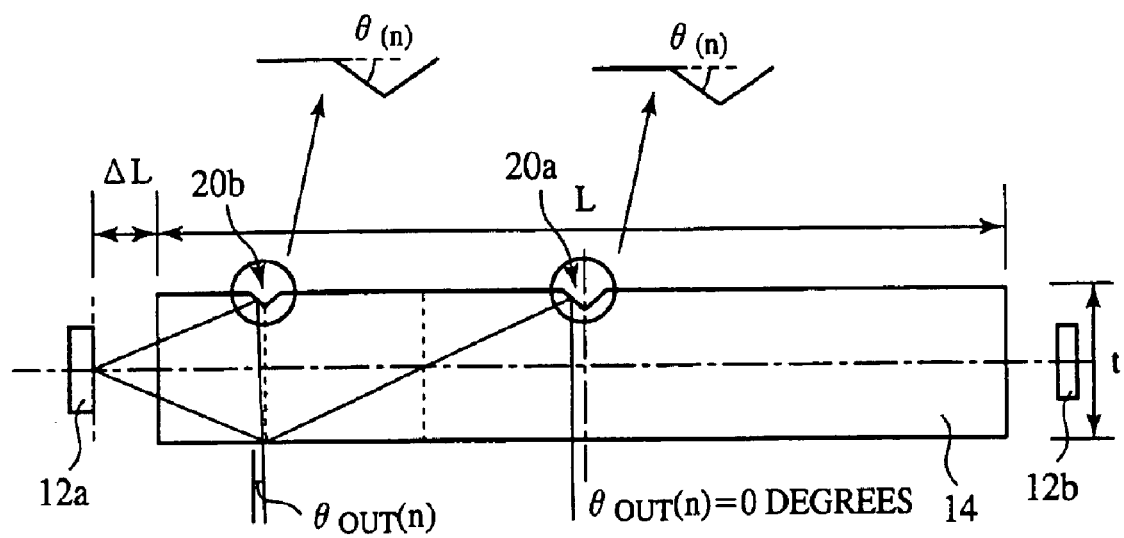
FIGS. 2A and 2B are plan views of the lighting apparatus according to the first embodiment of the present invention.
Figure 2B:
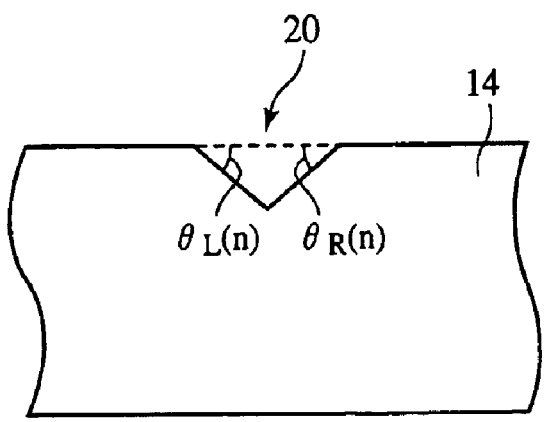
Figure 3:
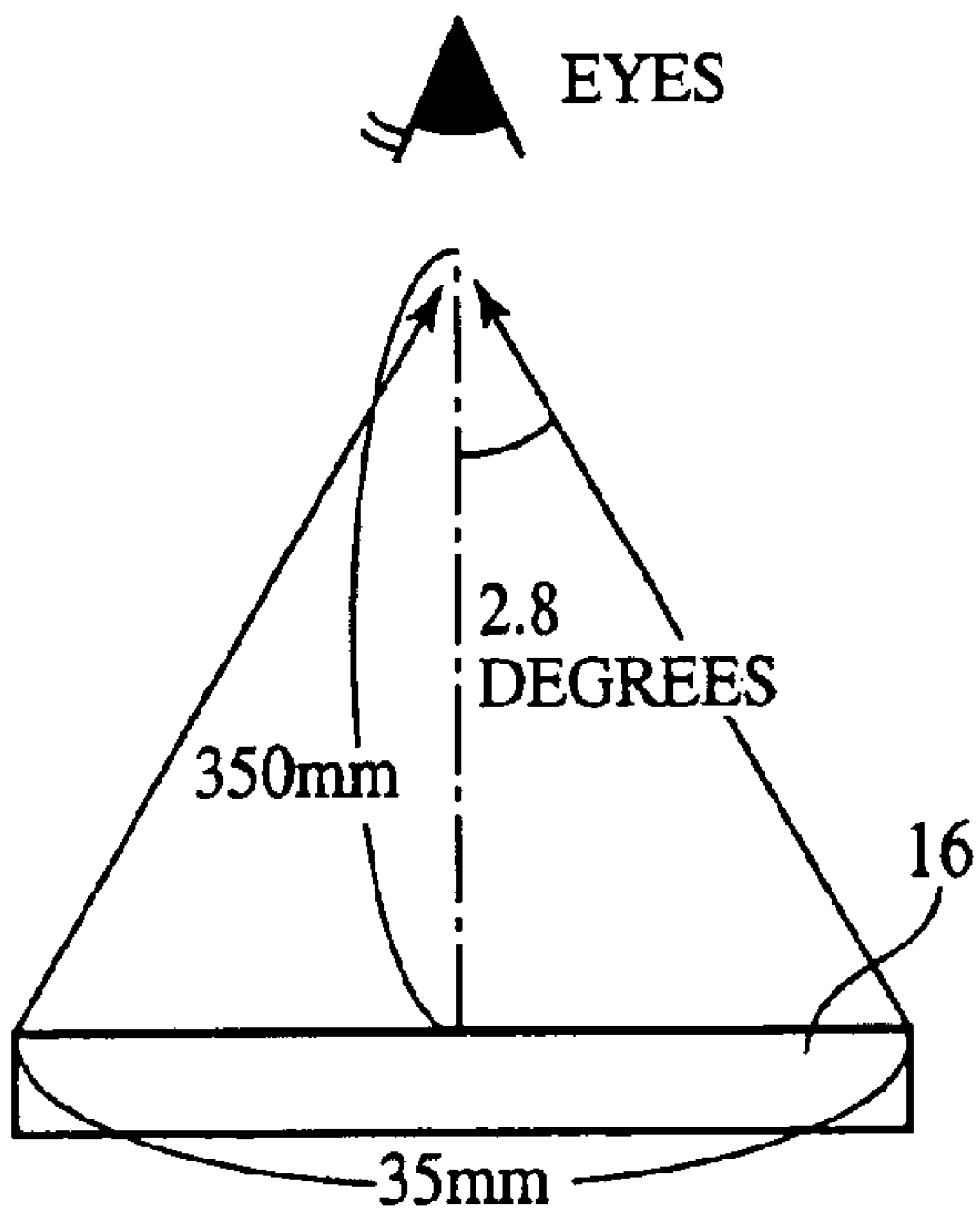
FIG. 3 is a diagrammatic view explaining relationships between the human eyes and the display screen.
Figure 4:
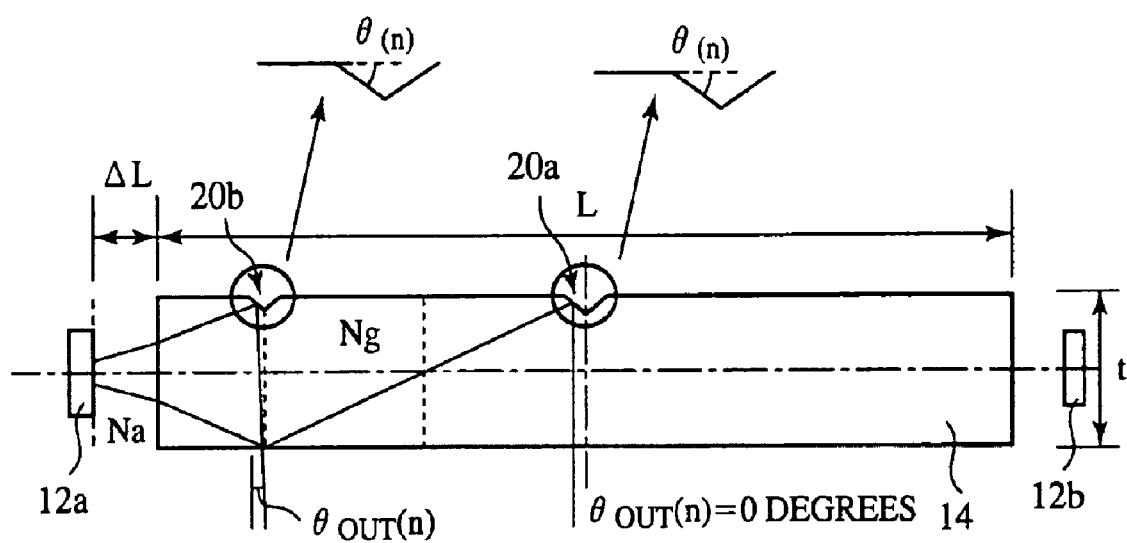
FIG. 4 is a plan view taking into consideration refractive indexes, etc. in the air.
Figure 5:
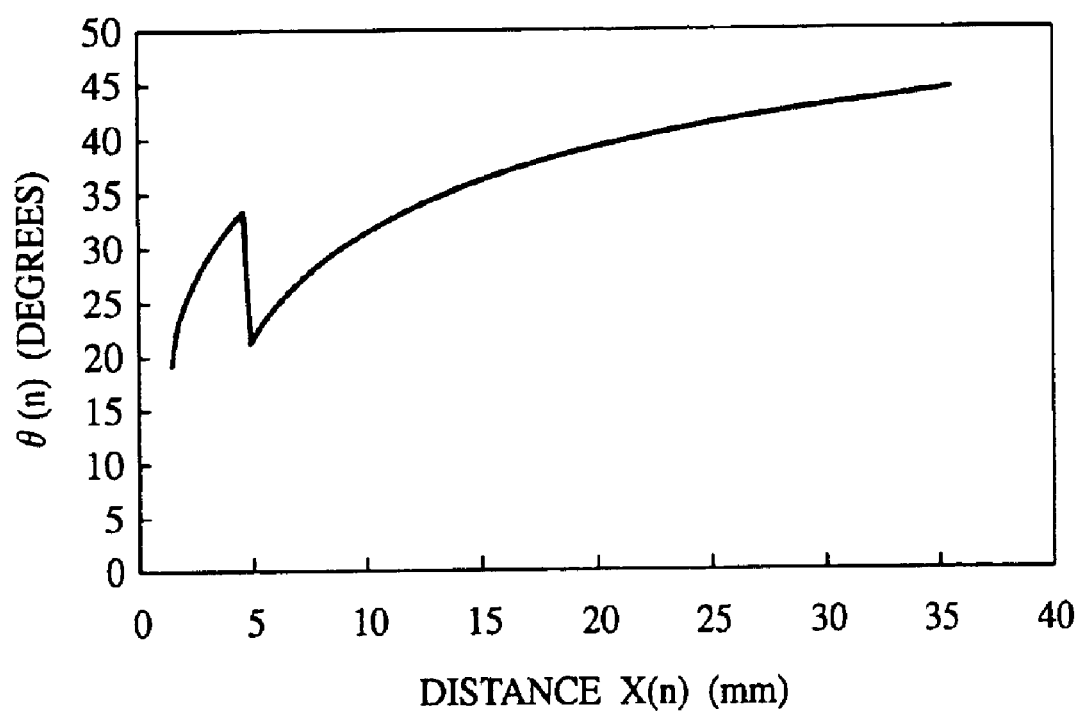
FIG. 5 is a graph of examples of tilt angles of the planes of the light reflection portions of the lighting apparatus according to the first embodiment of the present invention.
Figure 6:
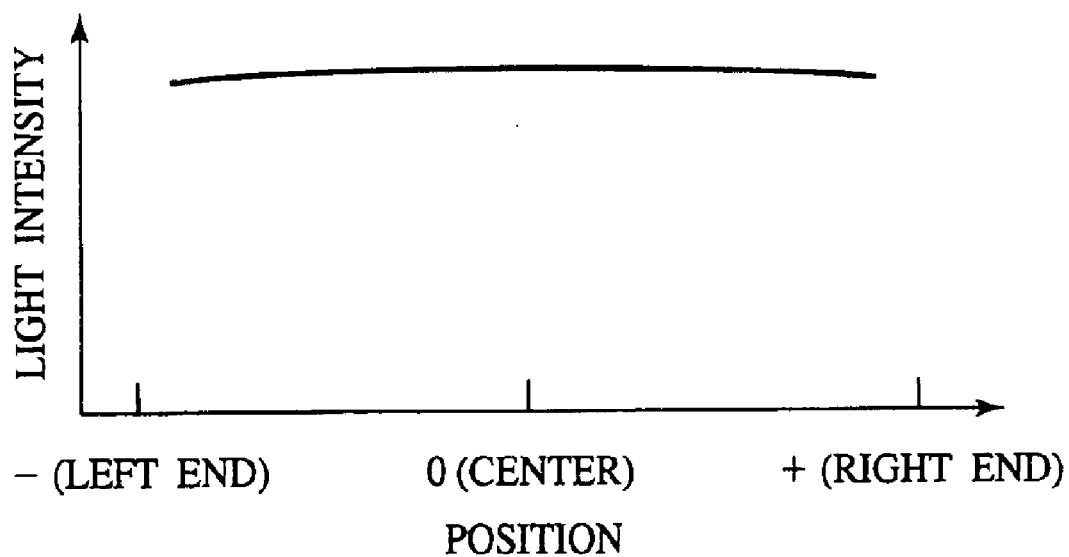
FIG. 6 is a graph of a light intensity distribution of the lighting apparatus according to the first embodiment of the present invention.

The lighting apparatus according to a first embodiment of the present invention will be explained with reference to FIGS. 1A to 6. FIG. 1A is a perspective view of the lighting apparatus according to the present embodiment. FIG. 1B is a plan view of the lighting apparatus according to the present embodiment. FIGS. 2A and 2B are plan views of the lighting apparatus according to the present embodiment, which show a constitution of the lighting apparatus. FIG. 2A is a plan view of the lighting apparatus according to the present embodiment, which shows the constitution of the lighting apparatus. FIG. 2B is a view showing tilt angles of light reflection portions of the lighting apparatus according to the present embodiment. FIG. 3 is a diagrammatic view showing relationships between the human eyes and a display screen. FIG. 4 is a plan view which takes into consideration of refractive indexes, etc. in the air. FIG. 5 is a graph of examples of the tilt angles of the light reflection portions of the lighting apparatus according to the present embodiment. FIG. 6 is a graph of a light intensity distribution of the lighting apparatus according to the present embodiment.

As shown in FIGS. 1A and 1B, the lighting apparatus 10 according to the present embodiment comprises LEDs 12a, 12b which emit light, and a linear photoconductor 14 which converts the light emitted by the LEDs 12a, 12b to linear light and emits the linear light, and a surface photoconductor 16 optically coupled with the linear photoconductor 14, which converts the linear light to surface light and emits the surface light. A reflection coated film 18 is formed on the reflection side of the linear photoconductor 14.

The LEDs 12a, 12b are disposed on both ends of the linear photoconductor 14. A distance ΔL (see FIG. 2A) between the linear photoconductor 14, and the LED 12a and the LED 12b is set to be, e.g., 0 mm.

The linear photoconductor 14 is formed generally in a square pole. The linear photoconductor 14 is made of, e.g., glass or plastics. A refractive index $N_g$ of the linear photoconductor 14 is, e.g., 1.51. A thickness t of the linear photoconductor 14 is, e.g., 3 mm. A length L of the photoconductor 14 is, e.g., 37 mm for the lighting apparatus used in, e.g., a 2 inch (5.08 cm)-liquid crystal display. The display screen of the 2 inch (5.08 cm)-liquid crystal display has an about 3.5 mm-width. The 37 mm-length L of the linear photoconductor 14 ensures a 2 mm-margin.

On the reflection side of the linear photoconductor 14, a plurality of the light reflection portions 20 are formed in stripes. The light reflection portions 20 cause light to exit from the exit side of the linear photoconductor 14. One hundred-fifty (150), for example, light reflection portions 20 are formed at, e.g., a 0.23 mm-pitch.

As shown in FIGS. 2A and 2B, tilt angles θ(n) of the planes of the light reflection portions 20a, 20b are set so that light can exit at required exit angles $\theta_{OUT}(n)$ corresponding to exit positions. The light reflection portions 20a, 20b are formed in the plural number on the reflection side of the linear photoconductor 14 but are omitted in FIGS. 2A and 2B.

As shown in FIG. 3, when the 2 inch (5.08 cm)-liquid crystal panel is watched at a position distant by 350 mm, light forming 0 degrees to the center of the display screen is incident on the human eyes, and light forming ±2.8 degrees to both ends of the screen is incident on the human eyes.

An exit angle $\theta_{OUT}(n)$ of light exiting the linear photoconductor 14 is reflected at an exit angle at which the light exits the surface photoconductor 16. For light exiting from the center of the linear photoconductor 14, a tilt angle θ(n) of the planes of the light reflection portions 20 is set so that an exit angle $\theta_{OUT}(n)$ is, e.g., 0 degrees. For light exiting from positions between the center of the linear photoconductor 14 and the ends thereof, tilt angles θ(n) of the planes of the light reflection portions 20 are respectively set so that exit angles $\theta_{OUT}(n)$ are respectively angles corresponding to the exit positions. For light exiting from positions near the ends of the linear photoconductor 14, tilt angles θ(n) of the planes of the light reflection portions 20 are set so that exit angles $\theta_{OUT}(n)$ are, e.g., ±2.8 degrees. Resultantly, very good display characteristics can be obtained.

In order to set an exit angle $\theta_{OUT}(n)$ exiting the linear photoconductor 14 at an angle corresponding to an exit position, a tilt angle θ(n) is given by the following formula.

As shown in FIG. 2A, in the light reflection portions 20a, a tilt angle θ(n) of the planes of the light reflection portions 20a is set so that light totally reflected on the plane on the exit side of the linear photoconductor 14 can be totally reflected on the light reflection portions 20a and can exit from the exit side of the linear photoconductor 14 at exit angles $\theta_{OUT}(n)$ corresponding to the exit positions.

In this case, the following formula is given.

$$\tan(2 \cdot \theta(n) - \theta_{OUT}(n)) = \frac{\Delta L + X(n)}{\frac{3}{2}t} \quad (1)$$

In Formula 1, n means an n-th light reflection portion. X(n) means a distance from the end surfaces of the linear photoconductor 14 to an n-th light reflection portion. $\theta_{OUT}(n)$ means an exit angle of light reflected on an n-th light reflection portion.

When Formula 1 is transformed, a tilt angle θ(n) of the planes of the light reflection portions 20a is expressed by the following formula.

$$\theta(n) = \frac{\tan^{-1}\left(\frac{\Delta L + X(n)}{\frac{3}{2}t}\right) + \theta_{OUT}(n)}{2} \quad (2)$$

In the light reflection portions 20b, a tilt angle θ(n) of the planes of the light reflection portions 20b is set so that light incident on the light reflection portions 20b directly from the LED 12a can be totally reflected on the planes of the light reflection portions 20b and can exit from the exit side of the linear photoconductor 14 at exit angles $\theta_{OUT}(n)$ corresponding to exit positions.

In this case, the following formula is given.

$$\tan(2 \cdot \theta(n) - \theta_{OUT}(n)) = \frac{\Delta L + X(n)}{\frac{1}{2}t} \quad (3)$$

When Formula 3 is transformed, a tilt angle θ(n) of the planes of the light reflection portions 20b is expressed by the following formula.

$$\theta(n) = \frac{\tan^{-1}\left(\frac{\Delta L + X(n)}{\frac{1}{2}t}\right) + \theta_{OUT}(n)}{2} \quad (4)$$

As shown in FIG. 2B, a tilt angle $\theta_L(n)$ of the left planes of the light reflection portions as viewed in the drawing is set so that light applied by the LED 12a disposed on the left side as viewed in the drawing exit at a required exit angle $\theta_{OUT}(n)$. On the other hand, a tilt angle $\theta_R(n)$ of the right planes of the light reflection portions as viewed in the drawing is set so that light applied by the LED 12b disposed on the right side as viewed in the drawing exit at a required exit angle $\theta_{OUT}(n)$.

Strictly, as shown in FIG. 4, if a distance ΔL between the linear photoconductor 14, and the LEDs 12a, 12b is not 0 mm, an optical path is deflected because a refractive index $N_a$ in the air is different from a refractive index $N_g$ in the linear photoconductor. However, the deflection of the optical path due to such factor is ignorable in giving tilt angles θ(n) of the planes of the light reflection portions 20. To simplify the calculation formulas, influences of such factor are ignored here to give the calculation formulas.

Strictly, as shown in FIG. 4, light is emitted in surfaces from vicinities of the centers of the LEDs 12a, 12b. In giving tilt angles θ(n) of the planes of the light reflection portions 20, the calculation formulas are given on the assumption that light is emitted from the central points of the LEDs 12a, 12b.

Errors made by the thus given formulas are ignorably small. To simplify the calculation formulas, the calculation formulas are given on the assumption that light is emitted from the central points of the LEDs 12a, 12b.

Then, examples of specific set values of tilt angles θ(n) of the planes of the light reflection portions 20 of the present embodiment will be explained with reference to FIG. 5. FIG. 5 is a graph of the examples of tilt angles θ(n) of the planes of the light reflection portions. Distances X(n) from the end surfaces of the linear photoconductor 14 to the light reflection portions 20 are taken on the horizontal axis. Tilt angles θ(n) of the planes of the light reflection portions 20 are taken on the vertical axis.

The tilt angles θ(n) were calculated under the conditions that a display size was 2 inches, a display screen width was 35 mm, a number of the light reflection portions 20 was 150, a pitch of the light reflection portions 20 was 0.23 mm, a thickness t of the linear photoconductor 14 was 3 mm, a length L of the linear photoconductor 14 was 37 mm, a distance ΔL between the LEDs 12a, 12b and the linear photoconductor 14 was 0 mm, a refractive index of the linear photoconductor 14 was 1.51, and a distance between the watching human eyes and the display screen was 350 mm.

When tilt angles θ(n) of the planes of the light reflection portions 20 are set as shown in FIG. 5, the light intensity distribution shown in FIG. 6 is obtained. FIG. 6 is a graph of a light intensity distribution of the lighting apparatus according to the present embodiment. Positions in the linear photoconductor are taken on the horizontal axis. Light intensities are taken on the vertical axis. Here, light exiting from the center of the linear photoconductor 14, which forms 0 degrees reaches the human eyes. Light exiting from the ends of the linear photoconductor 14, which forms ±2.8 degrees reaches the human eyes. An intensity distribution of light which actually can reach the human eyes is given.

As seen in FIG. 6, the lighting apparatus according to the present embodiment can provide a substantially uniform light intensity distribution.

As described above, the lighting apparatus according to the present embodiment is characterized mainly in that tilt angles θ(n) of the planes of the light reflection portions 20 are set so that light can exit at required exit angles $\theta_{OUT}(n)$ corresponding to exit positions of the light from the linear photoconductor 14.

Figure 29:
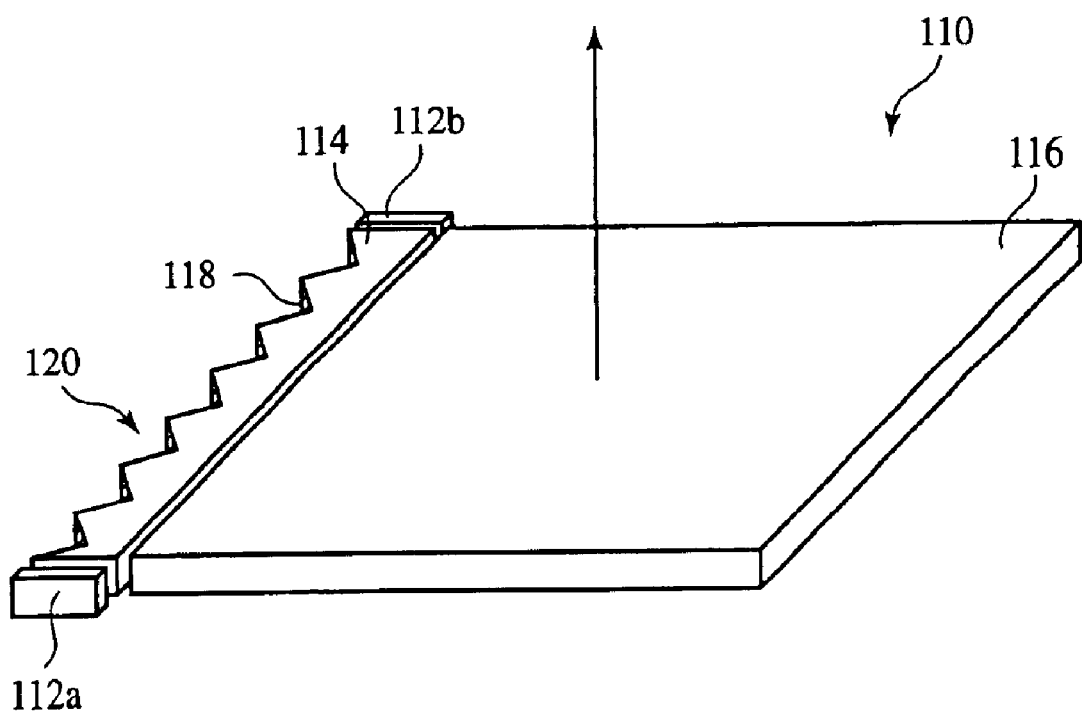
FIG. 29 is a perspective view of the proposed lighting apparatus.
Figure 30A:
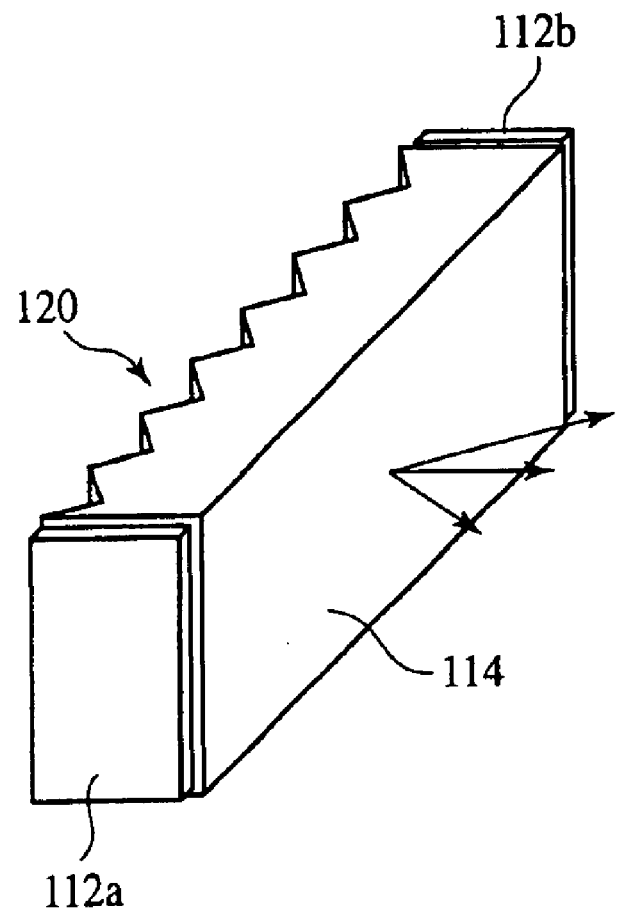
FIGS. 30A and 30B are, respectively, a perspective view and a plan view of the linear photoconductor of the proposed lighting apparatus.
Figure 30B:
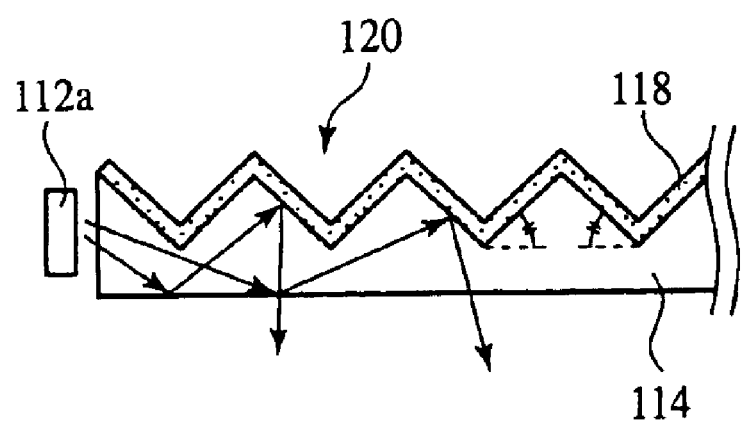
Figure 31:
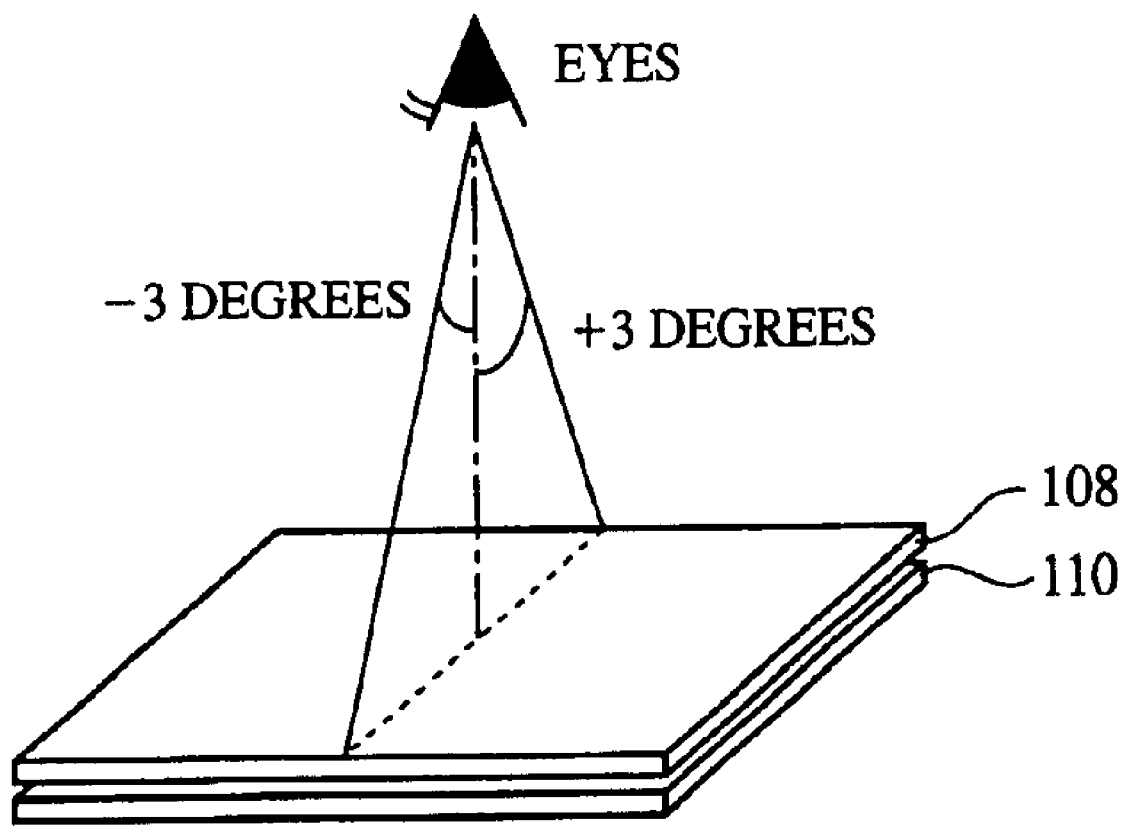
FIG. 31 is a conceptual view of relationships between the human eyes and the display screen.
Figure 32:
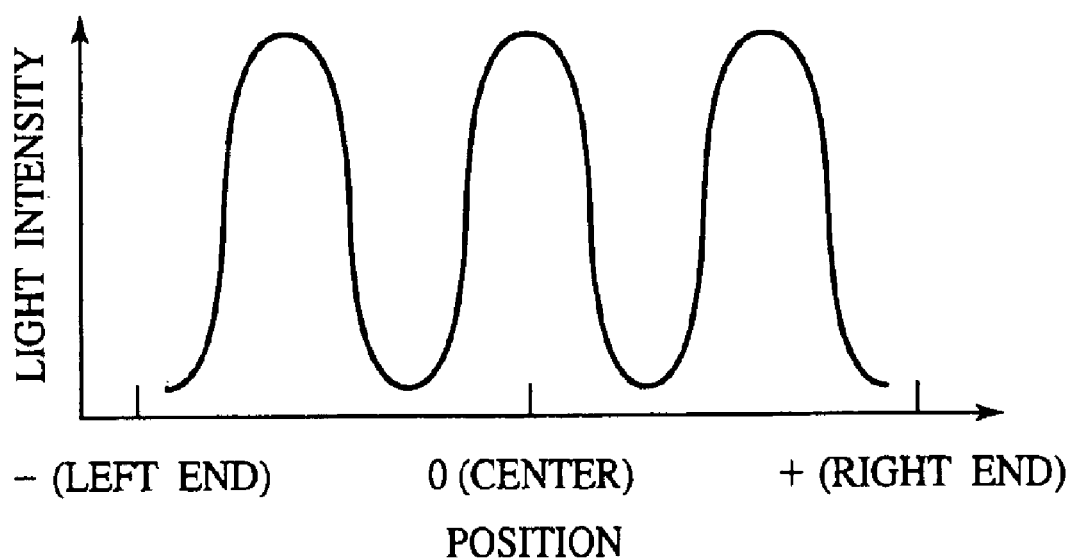
FIG. 32 is a graph of the intensity distribution of light exiting from the linear photoconductor of the proposed lighting apparatus.

In the proposed lighting apparatus shown in FIG. 29, because all the planes of the light reflection portions are set at the same tilt angle α (see FIG. 31), light cannot exit at required exit angles corresponding to exit positions. Accordingly, the proposed lighting apparatus cannot make a light intensity distribution of light which can reach the watching human eyes uniform.

In contrast to this, in the present embodiment, tilt angles θ(n) of the planes of the light reflection portions 20 are set so that light can exit at required exit angles $\theta_{OUT}(n)$ corresponding to exit positions of the light from the linear photoconductor 14. Accordingly, the light can be converged at the watching human eyes. Thus, according to the present embodiment, an intensity distribution of light which can arrive at the human eyes can be made uniform. Thus, according to the present embodiment, good display characteristics can be realized.

[A Second Embodiment]

Figure 7:
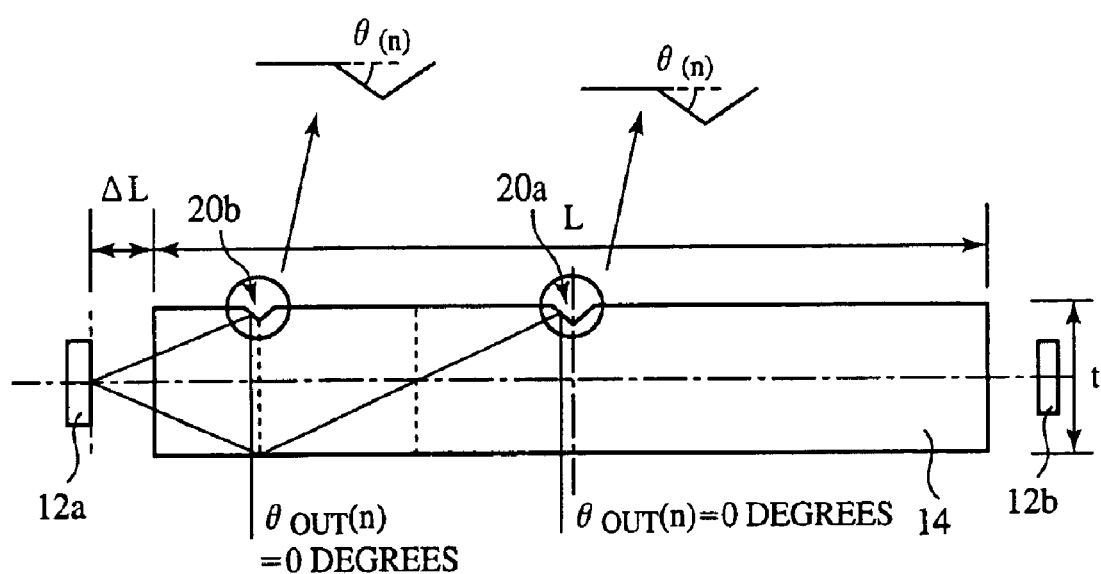
FIG. 7 is a plan view of the lighting apparatus according to a second embodiment of the present invention.
Figure 8:
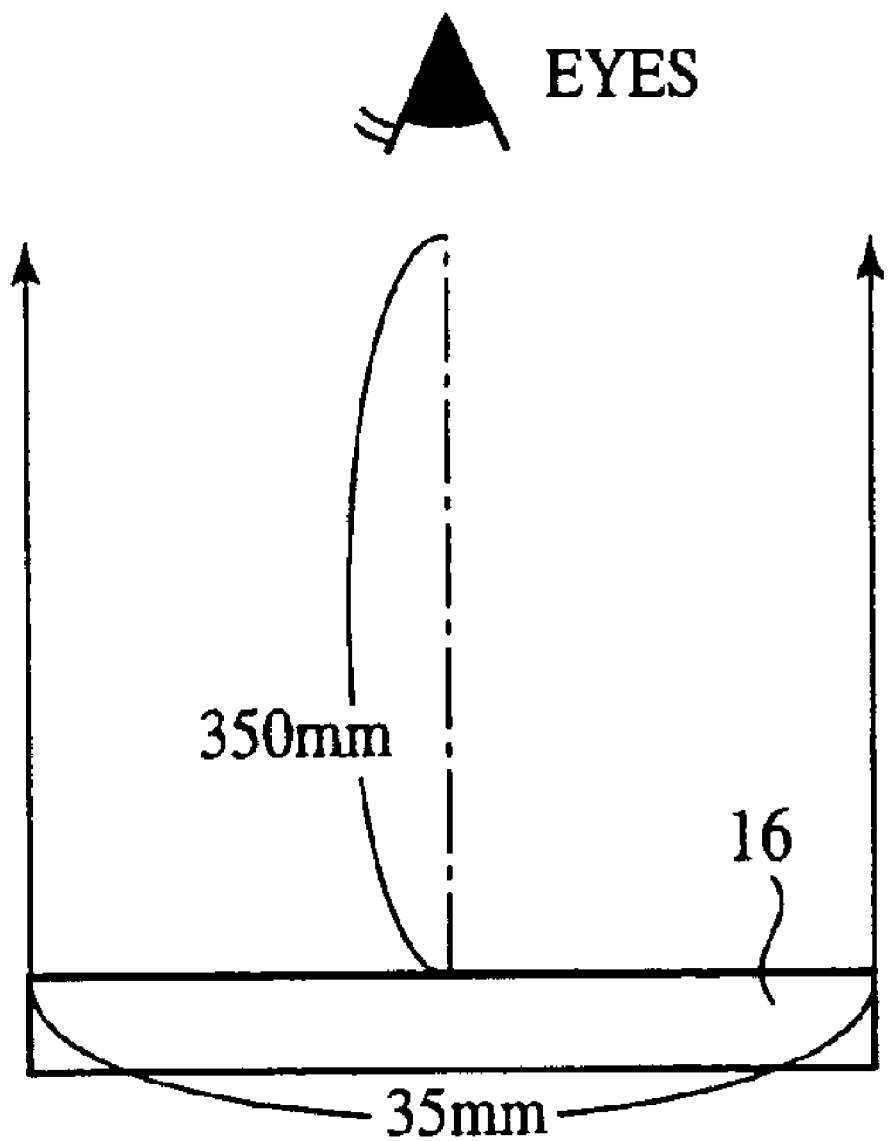
FIG. 8 is a diagrammatic view of relationships between the human eyes and a display screen.
Figure 9:
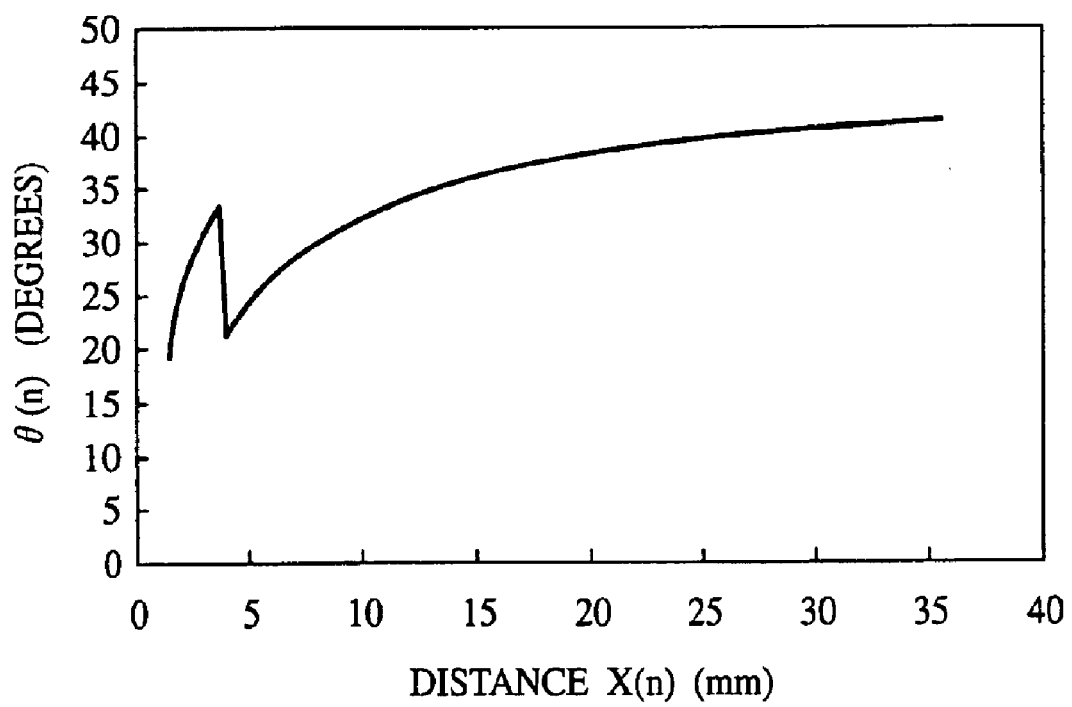
FIG. 9 is a graph of example of tilt angles of the planes of the light reflection portions of the lighting apparatus according to the second embodiment of the present invention.

The lighting apparatus according to a second embodiment of the present invention will be explained with reference to FIGS. 7 to 9. FIG. 7 is a plan view of the lighting apparatus according to the present embodiment. FIG. 8 is a conceptual view of relationships between the human eyes and a display screen. FIG. 9 is a graph of examples of tilt angles of planes of light reflection portions of the lighting apparatus according to the present embodiment. The same members of the present embodiment as those of the lighting apparatus according to the first embodiment are represented by the same reference numbers not to repeat or to simplify their explanation.

The lighting apparatus according to the present embodiment is characterized mainly in that tilt angles θ(n) of the planes of the light reflection portions 20 are respectively set so that light exits from a linear photoconductor 14 at a 0 degrees exit angle $\theta_{OUT}(n)$, i.e., in a direction vertical to the longitudinal direction of the photoconductor 14.

In the lighting apparatus according to the first embodiment, tilt angles θ(n) of the planes of the light reflection portions 20 are respectively set so that required exit angles $\theta_{OUT}(n)$ can be provided corresponding to exit positions. However, a position of the human eyes watching a display screen does not always agree with a normal direction of the surface photoconductor 16. On the other hand, even when exit angles $\theta_{OUT}(n)$ are set uniformly to be 0 degrees, light spreads to some extent by a time when the light arrives at the human eyes distant from the display screen by 350 mm, and actually the same light intensity distribution as that of the first embodiment can be provided. Setting exit angles $\theta_{OUT}(n)$ to be uniform facilitates the calculation for giving tilt angles θ(n) of the planes of the light reflection portions 20.

Then, in the present embodiment, exit angles $\theta_{OUT}(n)$ are set uniformly at 0 degrees.

In the present embodiment, to set exit angles $\theta_{OUT}(n)$ uniformly at 0 degrees, Formula 2 and Formula 4 are simply substituted with $\theta_{OUT}(n)=0$ degrees.

When Formula 2 is substituted with $\theta_{OUT}(n)=0$ degrees, tilt angles θ(n) of the planes of the light reflection portions 20a are expressed by the following formula.

$$\theta(n) = \frac{\tan^{-1}\left(\frac{\Delta L + X(n)}{\frac{3}{2}t}\right)}{2} \quad (5)$$

When the Formula 4 is substituted with $\theta_{OUT}(n)=0$ degrees, tilt angles θ(n) of the planes of the light reflection portions 20b are expressed by the following formula.

$$\theta(n) = \frac{\tan^{-1}\left(\frac{\Delta L + X(n)}{\frac{1}{2}t}\right)}{2} \quad (6)$$

Examples of set values of tilt angles θ(n) of the planes of the light reflection portions of the lighting apparatus according to the present embodiment will be explained with reference to FIG. 9. FIG. 9 is a graph of examples of tilt angles θ(n) of the planes of the light reflection portions given by the above-described formulas. Distances from the end surfaces of the linear photoconductor 14 to the light reflection portions 20a, 20b are taken on the horizontal axis. Tilt angles θ(n) of the planes of the light reflection portions 20a, 20b are taken on the vertical axis.

In the present embodiment as well in the first embodiment, the tilt angles θ(n) were calculated under the conditions that a display size was 2 inches, a display screen width was 35 mm, a number of the light reflection portions 20 was 150, a pitch of the light reflection portions 20 was 0.23 mm, a thickness t of the linear photoconductor 14 was 3 mm, a length L of the linear photoconductor 14 was 37 mm, a distance ΔL between the LEDs 12a, 12b and the linear photoconductor 14 was 0 mm, a refractive index of the linear photoconductor was 1.51, and a distance between the watching human eyes and the display screen was 350 mm.

When tilt angles θ(n) of the planes of the light reflection portions 20a, 20b are set to be as shown in FIG. 9, exit angles $\theta_{OUT}(n)$ of light exiting from the linear photoconductor 14 are all 0 degrees, and substantially the same uniform light intensity distribution as that of the first embodiment can be provided. Thus, the present embodiment as well as the first embodiment can realize good display characteristics can be realized.

[A Third Embodiment]

Figure 10:
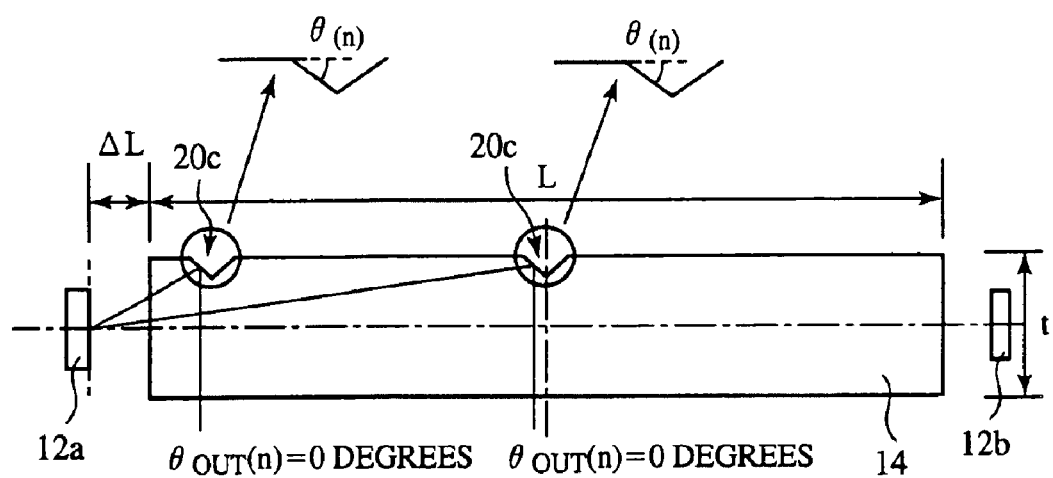
FIG. 10 is a plan view of the lighting apparatus according to a third embodiment of the present invention.
Figure 11:
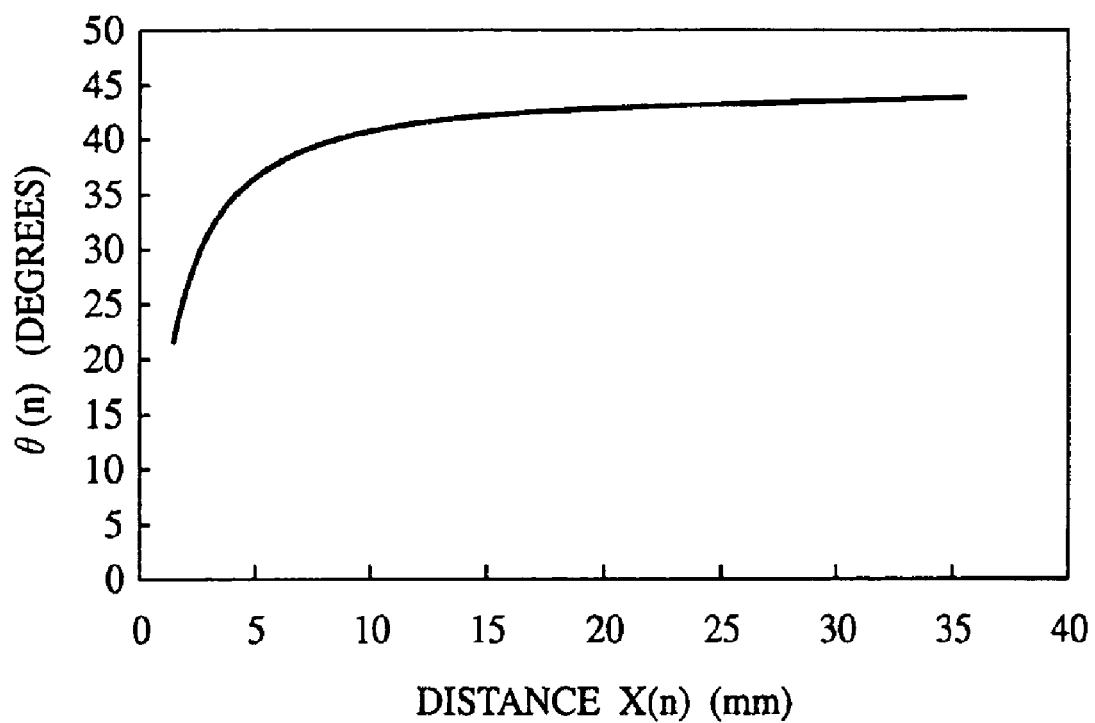
FIG. 11 is a graph of examples of tilt angles of the planes of the light reflection portions of the lighting apparatus according to a third embodiment of the present invention.

The lighting apparatus according to a third embodiment of the present invention will be explained with reference to FIGS. 10 and 11. FIG. 10 is a plan view of the lighting apparatus according to the present embodiment. FIG. 11 is a graph of examples of tilt angles of the planes of light reflection portions of the lighting apparatus according to the present embodiment. The same members of the present embodiment as those of the first or the second embodiment are represented by the same reference numbers not to repeat or to simplify their explanation.

The lighting apparatus according to the present embodiment is characterized mainly in that tilt angles θ(n) of the planes of light reflection portions are set so that light is incident from LEDs 12a, 12b directly on all light reflection portions 20c among the light reflection portions 20c, and the light is totally reflected on the light reflection portions 20c to exit from the exit side of a linear photoconductor 14.

The lighting apparatus according to the first and the second embodiments includes the light reflection portions 20a having tilt angles θ(n) set so that light totally reflected on the plane on the exit side of the linear photoconductor 14 is totally reflected further, and also the light reflection portions 20b having tilt angles θ(n) set so that light incident directly from the LEDs 12a, 12b is totally reflected.

In contrast to this, in the present embodiment, as shown in FIG. 10, tilt angles θ(n) of the planes of light reflection portions 20c are set so that all the light reflection portions 20c totally reflect light incident directly from an LED 12a and an LED 12b. The light reflection portions 20c are formed in a plural number on the reflection side of the linear photoconductor 14, but all of the light reflection portions 20c are not shown in FIG. 10.

In this case, tilt angles θ(n) of the planes of the light reflection portions 20c may be set by using Formula 4 or Formula 6.

Then, examples of set values of tilt angles θ(n) of the planes of the light reflection portions of the lighting apparatus according to the present embodiment will be explained with reference to FIG. 14. FIG. 11 is a graph of the example of tilt angles θ(n) of the planes of the light reflection portions, which were given by the above-described formula. Distances X(n) from the end surfaces of the linear photoconductor 14 to the light reflection portions 20c are taken on the horizontal axis. Tilt angles θ(n) of the planes of the light reflection portions 20c are taken on the vertical axis.

In the present embodiment as well as the first embodiment, the tilt angles θ(n) were calculated under the conditions that a display size was 2 inches, a display screen width was 35 mm, a number of the light reflection portions 20 was 150, a pitch of the light reflection portions 20 was 0.23 mm, a thickness t of the linear photoconductor 14 was 3 mm, a length L of the linear photoconductor 14 was 37 mm, a distance ΔL between the LEDs 12a, 12b and the linear photoconductor 14 was 0 mm, a refractive index of the linear photoconductor 14 was 1.51, and a distance between the watching human eyes and the display screen was 350 mm.

Even with tilt angles θ(n) of the planes of the light reflection portions 20c thus set, exit angles $\theta_{OUT}(n)$ out of light exiting from the linear photoconductor 14 are all 0 degrees, and substantially the same light intensity distribution as those of the first and the second embodiments can be provided. Accordingly, the present embodiment as well as the first and the second embodiments can realize good display characteristics.

[A Fourth Embodiment]

Figure 12:
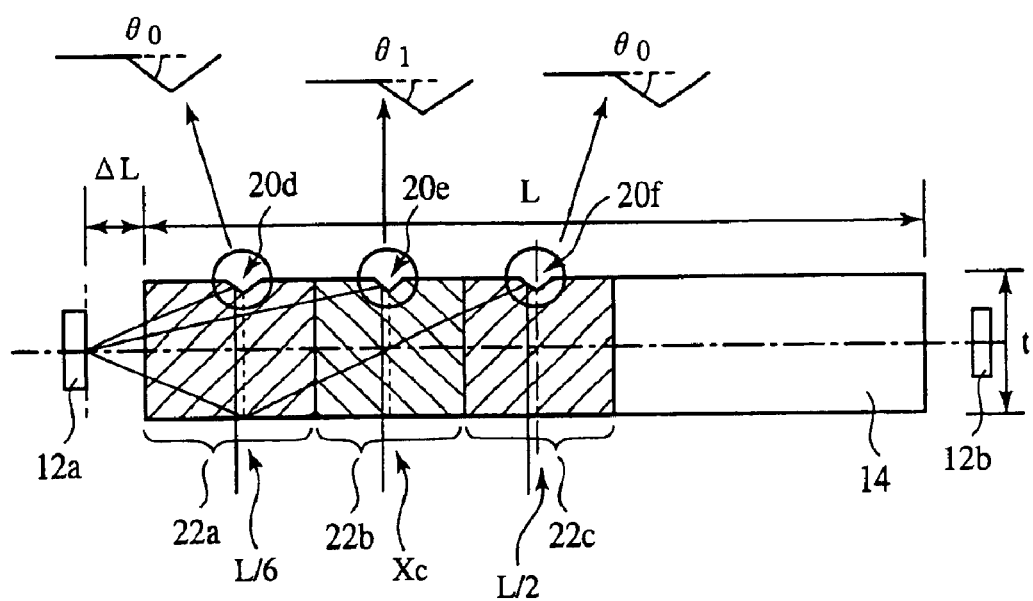
FIG. 12 is a plan view of the lighting apparatus according to a fourth embodiment of the present invention.
Figure 13:
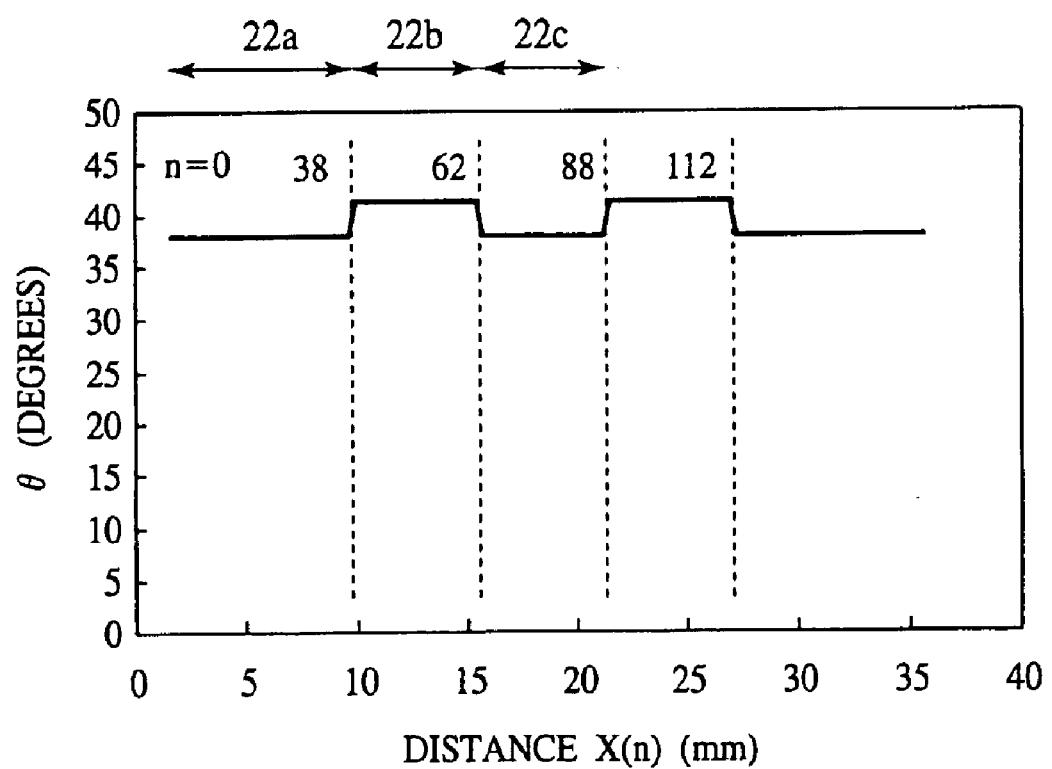
FIG. 13 is a graph of examples of tilt angles of the planes of the light reflection portions of the lighting apparatus according to a fourth embodiment of the present invention.

The lighting apparatus according to a fourth embodiment of the present invention will be explained with reference to FIGS. 12 to 14. FIG. 12 is a plan view of the lighting apparatus according to the present embodiment. FIG. 13 is a graph of example of tilt angles of the planes of light reflection portions of the lighting apparatus according to the present embodiment. FIG. 14 is a graph of a light intensity distribution of the lighting apparatus according to the present embodiment. The same members of the present embodiment as those of the lighting apparatus according to the first to the third embodiments are represented by the same reference numbers not to repeat or to simplify their explanation.

The lighting apparatus according to the present embodiment is characterized mainly in that the linear photoconductor 14 is longitudinally divided in a plurality of regions 22a, 22b, 22c, and tilt angles of the planes of a plurality of light reflection portions 20d–20f respectively formed in the divided regions 22a, 22b, 22c are set to be the same among the divided regions 22a, 22b, 22c.

A number of the light reflection portions 20d–20f are formed on the reflection side of the linear photoconductor 14, but almost all of them are not shown in FIG. 12.

In the region 22c containing the center of the linear photoconductor 14, a tilt angle $\theta_0$ of the planes of the light reflection portions 20f is set with respect to the central position L/2 of the linear photoconductor 14 as a standard. A tilt angle $\theta_0$ of the planes of the light reflection portions 20f is set so that light totally reflected on the plane of the exit side of the linear photoconductor 14 exits from the exit side of the linear photoconductor 14. Then, the following formula is given.

$$\tan(2 \cdot \theta_0) = \frac{\Delta L + \frac{L}{2}}{\frac{3}{2}t} \tag{7}$$

Formula 7 is transformed, and a tilt angle $\theta_0$ of the planes of the light reflection portions 20f is given by the following formula.

$$\theta_0 = \frac{\tan^{-1}\left(\frac{\Delta L + \frac{L}{2}}{\frac{3}{2}t}\right)}{2} \tag{8}$$

In the region 22a near the end of the linear photoconductor 14, a tilt angle $\theta'_0$ of the planes of the light reflection portions 20d is set with a position of L/6 of a distance from the ends of the linear photoconductor 14 set as a standard. A tilt angle $\theta'_0$ of the planes of the light reflection portions 20d is set so that light incident directly on the light reflection portions 20d from the LED 12a is totally reflected on the light reflection portions 20d and exit from the exit side of the linear photoconductor 14. The following formula is given.

$$\tan(2 \cdot \theta'_0) = \frac{\Delta L + \frac{L}{6}}{\frac{1}{2}t} \tag{9}$$

Formula 9 is transformed, and a tilt angle $\theta'_0$ of the planes of the light reflection portions 20d is expressed by the following formula.

$$\theta'_0 = \frac{\tan^{-1}\left(\frac{3 \cdot \Delta L + \frac{L}{2}}{\frac{3}{2}t}\right)}{2} \tag{10}$$

Here, when Formula 8 and Formula 10 are compared with each other, a value of ΔL is very small, and ΔL and 3·ΔL are ignorable. The following formula is given.

$$\theta_0 \approx \theta'_0 \tag{11}$$

Accordingly, in the region 22a near the ends of the linear photoconductor 14 as well, a tilt angle $\theta_0$ of the planes of the light reflection portions 20d may be set by using Formula 8. Thus, in the present embodiment, a tilt angle of the planes of the light reflection portions 20f containing the center of the linear photoconductor 14, and a tilt angle of the planes of the light reflection portions 20d of the region 22a near the ends of the linear photoconductor 14 may be equally set to be $\theta_0$.

In the region 22b between the region 22a and the region 22c, a tilt angle $\theta_1$ of the planes of the light reflection portions 20e is set with a position ($X_C$) of the center of the region 22b set as a standard. A tilt angle $\theta_1$ of the planes of the light reflection portions 20e is set so that light incident directly on the light reflection portions 20e from the LED 12a is totally reflected on the light reflection portions 20e and exit from the exit side of the linear photoconductor 14. Then the following formula is given.

$$\tan(2 \cdot \theta_1) = \frac{\Delta L + X_C}{\frac{1}{2}t} \tag{12}$$

Formula 12 is transformed, and a tilt angle $\theta_1$ of the planes of the light reflection portions 20e is expressed by the following formula.

$$\theta_1 = \frac{\tan^{-1}\left(\frac{\Delta L + X_C}{\frac{1}{2}t}\right)}{2} \tag{13}$$

Examples of set values of tilt angles of the planes of the light reflection portions of the lighting apparatus according to the present embodiment will be explained with reference to FIG. 13. FIG. 13 is a graph of the examples of tile angles θ of the planes of the light reflection portions given by using the above-described formula. Distances X(n) from the end surfaces of the linear photoconductor to the light reflection portions are taken on the horizontal line. Tilt angles θ of the planes of the light reflection portions are taken on the vertical axis.

In the present embodiment as well as in the first embodiment, the tilt angles θ(n) were calculated under the conditions that a display size was 2 inches, a display screen width was 35 mm, a number of the light reflection portions 20 was 150, a pitch of the light reflection portions 20 was 0.23 mm, a thickness t of the linear photoconductor 14 was 3 mm, a length L of the linear photoconductor 14 was 37 mm, a distance ΔL between the LEDs 12a, 12b and the linear photoconductor 14 was 0 mm, a refractive index of the linear photoconductor was 1.51, and a distance between the watching human eyes and the display screen was 350 mm.

When tilt angles $\theta_0$, $\theta_1$ of the planes of the light deflection portions 20d–20f are set by using Formula 8 and Formula 13, the light intensity distribution shown in FIG. 13 can be obtained. FIG. 13 is a graph of an example of the light intensity distribution of the lighting apparatus according to the present embodiment. Positions with respect to the center of the linear photoconductor 14 are taken on the horizontal axis. Light intensities given when the liquid crystal display is watched at a position distant from the liquid crystal display by 350 mm.

In the present embodiment, because tilt angles $\theta_0$, $\theta_1$ of the planes of the light reflection portions 20d, 20e, 20f are uniformly the same among the divided regions 22a, 22b, 22c, as positions of the light reflection portions 20d, 20e, 20f becomes remoter from the standard positions L/2, $X_C$, L/6, exit angles at which light exit from the linear photoconductor 14 gradually become larger. Thus, the present embodiment provides the light intensity distribution shown in FIG. 14.

Figure 14:
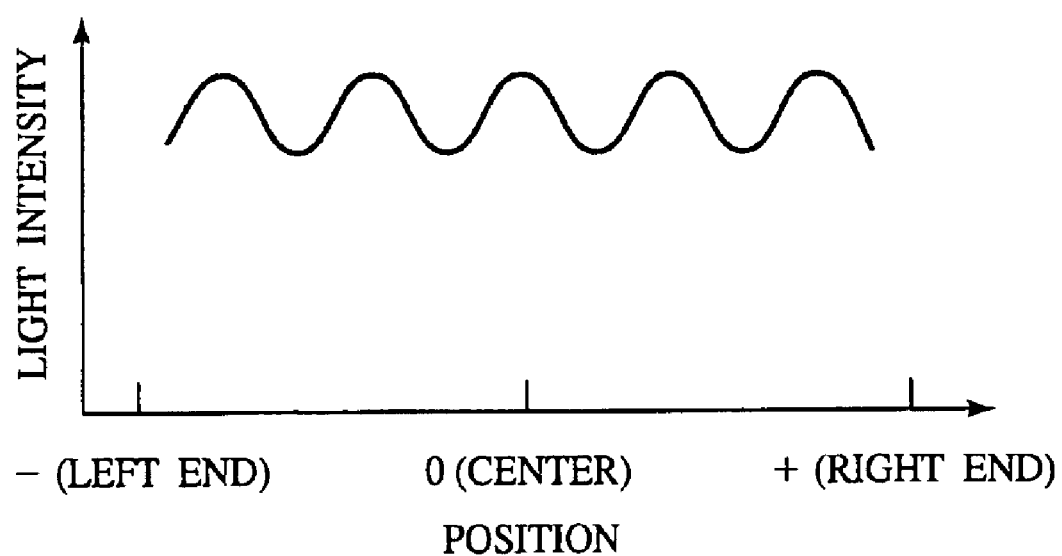
FIG. 14 is a graph of a light intensity distribution of the lighting apparatus according to the fourth embodiment of the present invention.

As seen in FIG. 14, the present embodiment cannot make the light intensity distribution as uniform as the lighting apparatus according to the first to the third embodiments, but in comparison with that of the proposed lighting apparatus shown in FIG. 29, the light intensity distribution of the present invention is far more uniform.

As described above, it is one major characteristic of the lighting apparatus according to the present embodiment that the linear photoconductor 14 is longitudinally divided in a plurality of regions 22a, 22b, 22c, and tilt angles of the planes of the light reflection portions 20d–20f are set to be the same among the divided regions 22a, 22b, 22c.

Setting tilt angles of the light reflection portions corresponding to positions of the light reflection portions as in the first to the third embodiments will increase costs of preparing a cast, etc. for casting the linear photoconductor.

In contrast to this, according to the present embodiment, tilt angles of the planes of the light reflection portions 20d, 20e, 20f are set at two kinds $\theta_0$ and $\theta_1$, and are very few. This makes it possible to reduce costs of preparing a cast, etc. for casting the linear photoconductor. As described above, the lighting apparatus according to the present embodiment can provide a uniform light intensity distribution simply and at low costs.

[A Fifth Embodiment]

Figure 15:
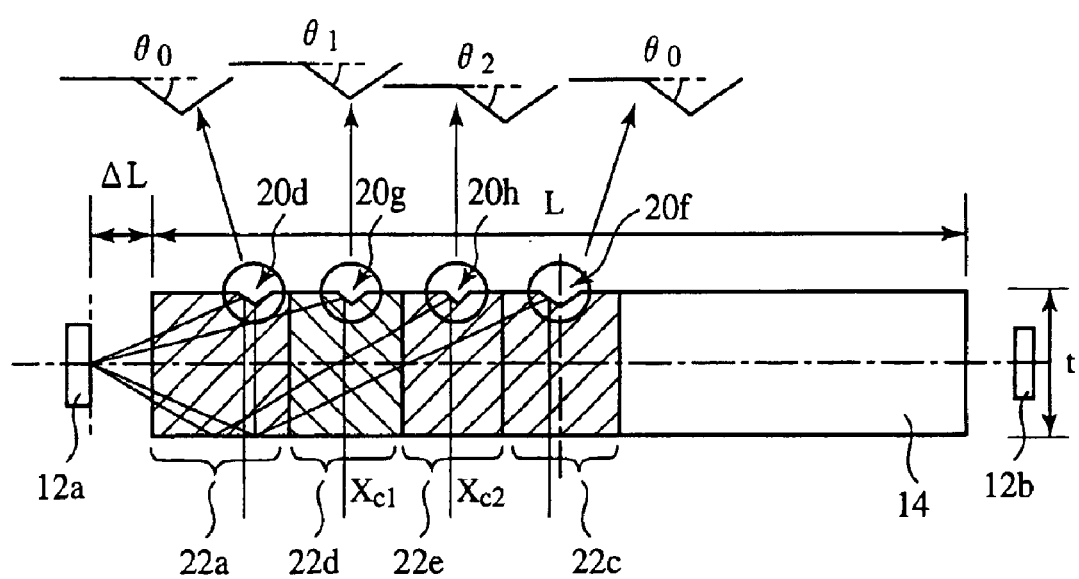
FIG. 15 is a plan view of the lighting apparatus according to a fifth embodiment of the present invention.
Figure 16:
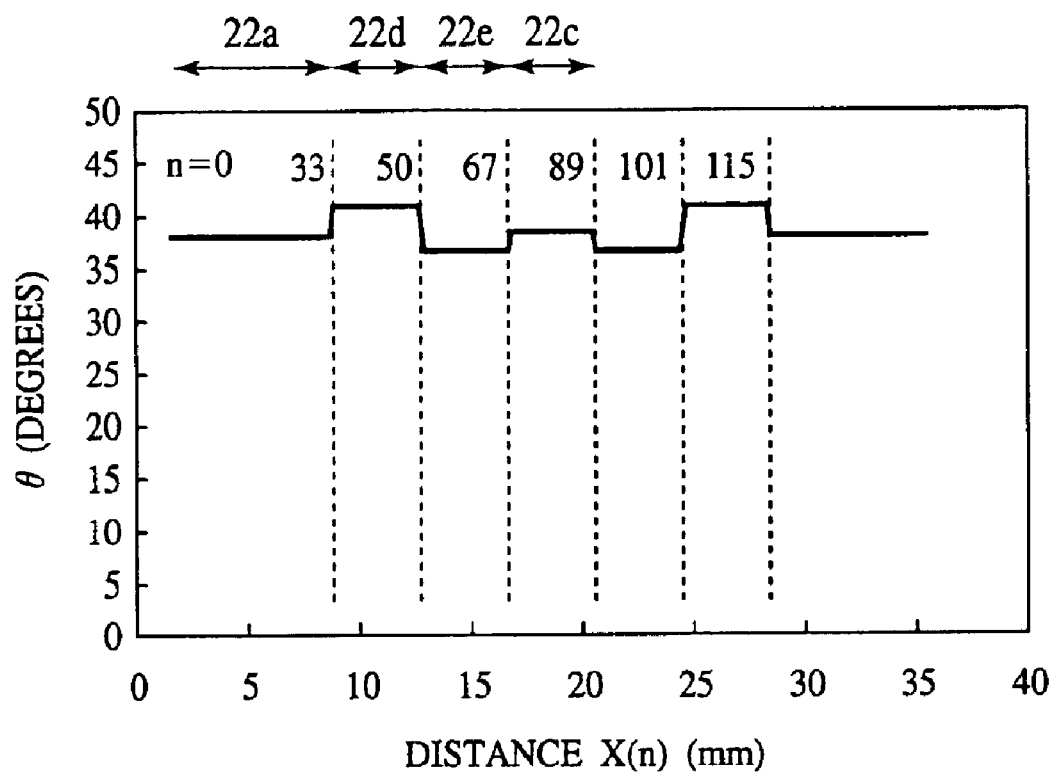
FIG. 16 is a graph of examples of tilt angles of the planes of light reflection portions of the lighting apparatus according to the fifth embodiment of the present invention.
Figure 17:
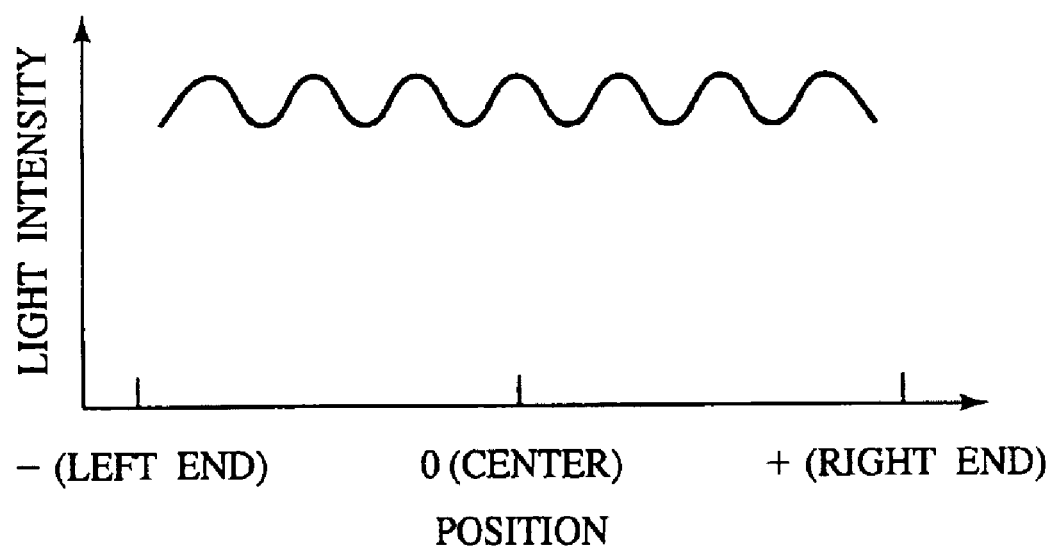
FIG. 17 is a graph of the light intensity distribution of the lighting apparatus according to the fifth embodiment of the present invention.

The lighting apparatus according to a fifth embodiment of the present invention will be explained with reference to FIGS. 15 to 17. FIG. 15 is a plan view of the lighting apparatus according to the present embodiment. FIG. 16 is a graph of examples of tilt angles of the planes of light reflection portions of the lighting apparatus according to the present embodiment. FIG. 17 is a graph of the light intensity distribution of the lighting apparatus according to the present embodiment. The same members of the present embodiment as those of the lighting apparatus according to the first to the fourth embodiments are represented by the same reference numbers not to repeat or to simplify their explanation.

The lighting apparatus according to the present embodiment is characterized mainly in that a linear photoconductor 14 is longitudinally further divided than that of the fourth embodiment. Tilt angles of the planes of a plurality of light reflection portions 20d, 20f, 20g, 20h are formed respectively in the regions 22a, 22c, 22d, 22e are set to be the same among the divided regions 22a, 22c, 22d, 22e.

The light reflection portions 20d, 20f, 20g, 20h are formed respectively in large numbers on the reflection side of the linear photoconductor 14, but almost all of them are not shown in FIG. 15.

In the region 22d, a tilt angle $\theta_1$ of the planes of light reflection portions 20g is set with a position $X_{C1}$ which is the center of the region 22d set as a standard. A tilt angle $\theta_1$ of the planes of the light reflection portions 20g is set so that light incident directly on the light reflections 20g from an LED 12a is totally reflected on the planes of the light reflection portions 20g and exit from the exit side of the linear photoconductor 14. Then the following formula is given.

$$\tan(2 \cdot \theta_1) = \frac{\Delta L + X_{C1}}{\frac{1}{2}t} \qquad (14)$$

Formula 14 is transformed, and a tilt angle $\theta_1$ of the planes of the light reflection portions 20g is expressed by the following formula.

$$\theta_1 = \frac{\tan^{-1}\left(\frac{\Delta L + X_{C1}}{\frac{1}{2}t}\right)}{2} \qquad (15)$$

In the region 22h, a tilt angle $\theta_2$ of the planes of the light reflection portions 20h is set with a position $X_{C2}$ of the center of the region 22h set as a standard. A tilt angle $\theta_2$ of the plane of the light reflection region 20h is set so that light totally reflected on the exit side of the linear photoconductor 14 is further totally reflected and exit from the exit side of the linear photoconductor 14. Then, the following formula is given.

$$\tan(2 \cdot \theta_2) = \frac{\Delta L + X_{C2}}{\frac{3}{2}t} \qquad (16)$$

Formula 16 is transformed, and a tilt angle $\theta_2$ of the planes of the light reflection portions 20h is expressed by the following formula.

$$\theta_2 = \frac{\tan^{-1}\left(\frac{\Delta L + X_{C2}}{\frac{3}{2}t}\right)}{2} \qquad (17)$$

Then, examples of set values of tilt angles of the planes of the light reflection portions of the lighting apparatus according to the present embodiment will be explained with reference to FIG. 16. FIG. 16 is a graph of the examples of tilt angles of the light reflection portions given by using the above-described formula. Distances X(n) from the end surfaces of the linear photoconductor and the light reflection portions are taken on the horizontal axis. Title angles of the planes of the light reflection portions are taken on the vertical axis.

In the present embodiment as well as in the first embodiment, the tilt angles θ(n) were calculated under the conditions that a display size was 2 inches, a display screen width was 35 mm, a number of the light reflection portions 20 was 150, a pitch of the light reflection portions 20 was 0.23 mm, a thickness t of the linear photoconductor 14 was 3 mm, a length L of the linear photoconductor 14 was 37 mm, a distance ΔL between the LEDs 12a, 12b and the linear photoconductor 14 was 0 mm, a refractive index of the linear photoconductor 14 was 1.51, and a distance between the watching human eyes and the display screen was 350 mm.

In the present embodiment, title angles $\theta_0$, $\theta_1$, $\theta_2$ of the planes of the light reflection portions 20d, 20f, 20g, 20h are uniformly set to be the same among the divided region 22a, 22c, 22d, 22e. Accordingly, as positions of the light reflection portions 20d, 20f, 20g, 20h become remoter from the standard positions L/2, $X_{C1}$, $X_{C2}$, L/6, exit angles at which light exit from the linear photoconductor 14 gradually become larger. Thus, the present embodiment has the light intensity distribution shown in FIG. 17.

As seen in FIG. 17, in comparison with the light intensity distribution of the lighting apparatus according to the fourth embodiment shown in FIG. 14, the light intensity distribution of the present embodiment has a smaller difference between a high light intensity and a low light intensity.

Based on this, according to the present embodiment, in comparison with the fourth embodiment, a difference between a high light intensity and a low light intensity can be small.

As described above, according to the present embodiment, because the photoconductor is longitudinally divided in smaller regions than in the fourth embodiment, a difference between a high light intensity and a low light intensity can be smaller in comparison with that of the fourth embodiment.

(Modification)

Figure 18:
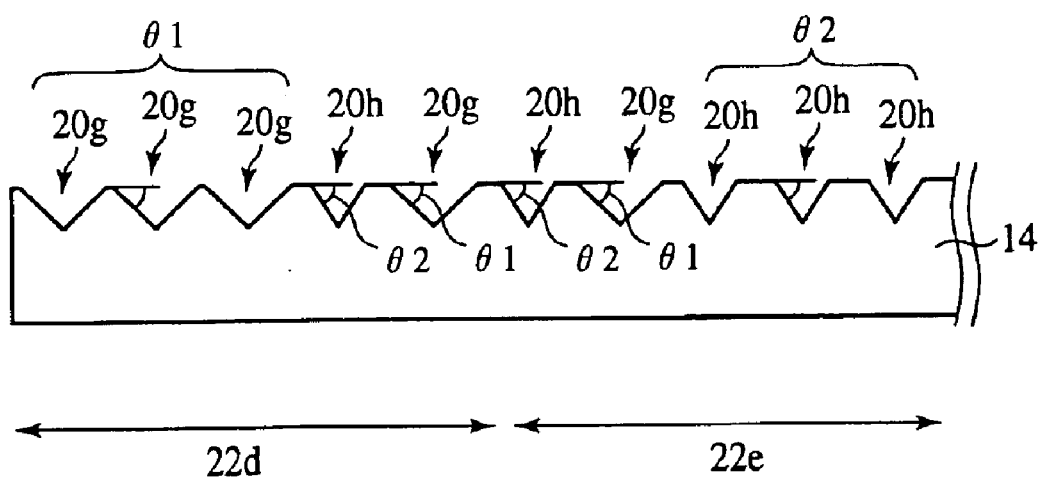
FIG. 18 is a plan view of the lighting apparatus according to a modification of the fifth embodiment of the present invention.

The lighting apparatus according to a modification of the present invention will be explained with reference to FIG. 18. FIG. 18 is a plan view of the lighting apparatus according to the present modification.

The lighting apparatus according to the present modification is mainly characterized in that in a bordering region between a region 22d and a region 22e, a light reflection portion 20g having a tilt angle $\theta_1$ and a light reflection region 20h having a tilt angle $\theta_2$ are alternately formed.

In the present modification, in a bordering region between a region 22d and a region 22e, a light reflection portion 20g having a tilt angle $\theta_1$ and a light reflection region 20h having a tilt angle $\theta_2$ are alternately formed, whereby an extreme light intensity difference at the border between the region 22d and the region 22e can be prevented.

[A Sixth Embodiment]

Figure 19:
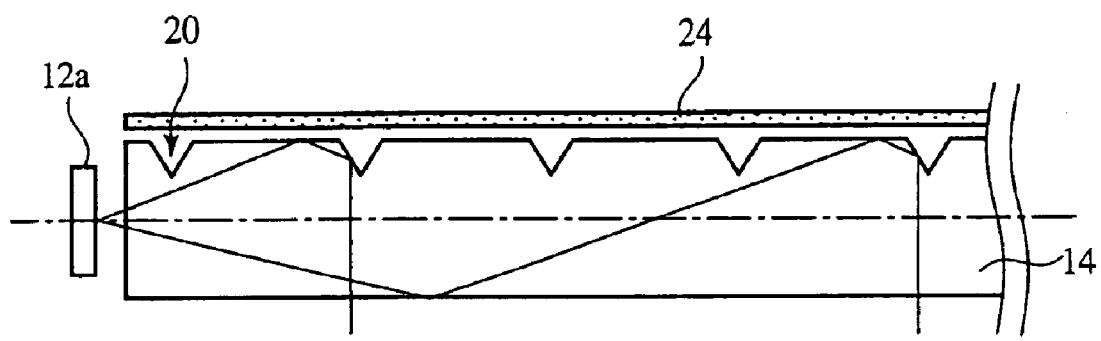
FIG. 19 is a plan view of the lighting apparatus according to a sixth embodiment of the present invention.

The lighting apparatus according to a sixth embodiment of the present invention will be explained with reference to FIG. 19. FIG. 19 is a plan view of the lighting apparatus according to the present embodiment. The same members of the present embodiment as those of the lighting apparatus according to the first to the fifth embodiments are represented by the same reference numbers not to repeat or to simplify their explanation.

The lighting apparatus according to the present embodiment is characterized mainly in that reflection means 24 which is separate from the linear photoconductor 14 is disposed on the reflection side of the linear photoconductor 14, i.e., the side where light reflection portions 20 are formed.

As shown in FIG. 19, in the present embodiment, reflection means 24 is disposed separate from the photoconductor 14 on the reflection side of the linear photoconductor 14. The reflection means 24 can be a holder or others of aluminum covering at least the reflection side of the linear photoconductor 14.

In the first to the fifth embodiments, the reflection coat film 20 is formed on the reflection side of the linear photoconductor 14 to prevent light from leaking outside from the reflection side of the linear photoconductor 14. However, in the present embodiment, the reflection means 24 disposed separate from the linear photoconductor 14 returns into the linear photoconductor 14 light leaking from the reflection side of the linear photoconductor 14.

Even the reflection means 24 provided in place of the reflection coat film 20 can return into the linear photoconductor 14 light leaking from the reflection side of the linear photoconductor 14, whereby the lighting is prevented from generally becoming less luminous.

As described above, it is not essential to form the reflection coat film 20 on the reflection side of the linear photoconductor 14. As in the present embodiment, the reflection means 24 may be provided separate from the linear photoconductor 14.

[A Seventh Embodiment]

Figure 20:
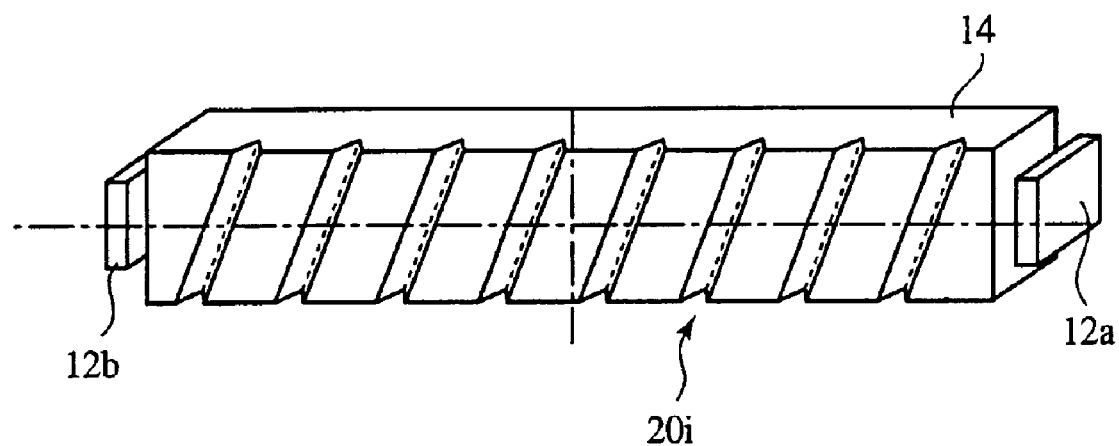
FIG. 20 is a perspective view of the lighting apparatus according to a seventh embodiment of the present invention.

The lighting apparatus according to a seventh embodiment of the present invention will be explained with reference to FIG. 20. FIG. 20 is a perspective view of the lighting apparatus according to the present embodiment. The same members of the present embodiment as those of the lighting apparatus according to the first to the sixth embodiments are represented by the same reference numbers not to repeat or to simplify their explanation.

The lighting apparatus according to the present embodiment is characterized mainly in that light reflection portions 20j are obliquely extended longitudinally in a linear photoconductor 14.

In the lighting apparatus according to the first to the sixth embodiments, the light reflection portions 20 are vertically extended longitudinally in the linear photoconductor 14. In the present embodiment, however, the light reflection portions 20j are obliquely extended longitudinally in the linear photoconductor 14.

According to the present embodiment, because the light reflection portions 20i are obliquely extended longitudinally in the linear photoconductor 14, the light intensity distribution can be made further uniform.

[An Eighth Embodiment]

Figure 21:
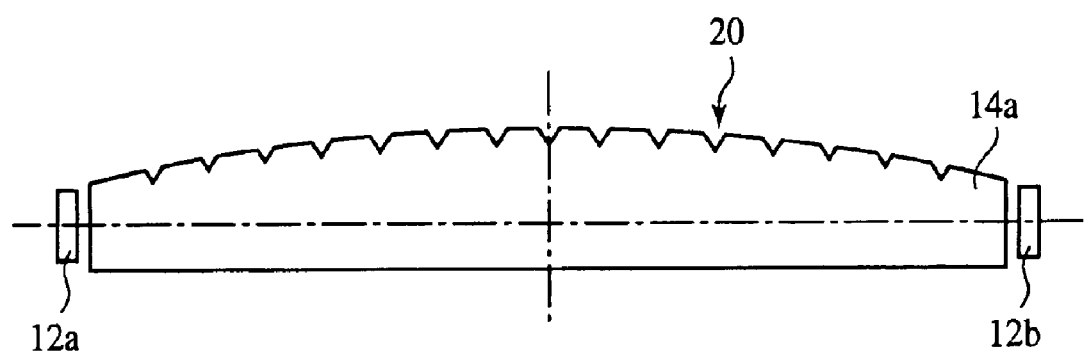
FIG. 21 is a plan view of the lighting apparatus according to an eighth embodiment of the present invention.

The lighting apparatus according to an eighth embodiment of the present invention will be explained with reference to FIG. 21. FIG. 21 is a plan view of the lighting apparatus according to the present embodiment. The same members of the present embodiment as those of the lighting apparatus according to the first to the seventh embodiments are represented by the same reference numbers not to repeat or to simplify their explanation.

The lighting apparatus according to the present embodiment is mainly characterized in that the reflection side of a liner photoconductor 14a, i.e., the side where light reflection portions 20 are formed, is curved.

In the lighting apparatus according to the first to the seventh embodiments, light from the LEDs 12a, 12b can be often hindered from entering those of the light reflection portions 20 remote from the LEDs 12a, 12b, by the rest light reflection portions 20.

In contrast to this, according to the present embodiment, because the reflection side of the linear photoconductor 14a is curved, light can be incident even on those of the light reflection portions 20 remote from the LEDs 12a, 12b without being hindered by the rest light reflection portions 20. Thus, the lighting apparatus according to the present embodiment can provide a further uniform light intensity distribution.

[A Ninth Embodiment]

Figure 22:
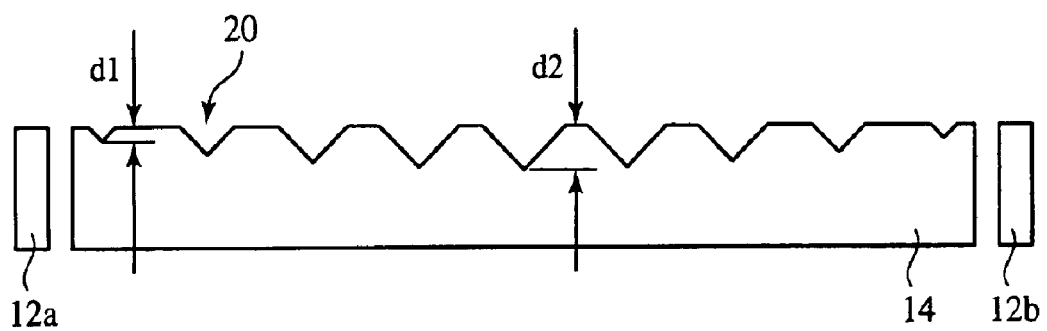
FIG. 22 is a plan view of the lighting apparatus according to a ninth embodiment of the present invention.

The lighting apparatus according to a ninth embodiment of the present invention will be explained with reference to FIG. 22. FIG. 22 is a plan view of the lighting apparatus according to the present embodiment. The same members of the present embodiment as those of the lighting apparatus according to the first to the eighth embodiments are represented by the same reference numbers not to repeat or to simplify their explanation.

The lighting apparatus according to the present embodiment is characterized mainly in that the planes of light reflection portions 20 are increased as the planes are remoter from LED 12a, 12b, i.e., grooves forming the light reflection portions 20 are deeper as the grooves are remoter from the LEDs 12a, 12b.

As shown in FIG. 22, the lighting apparatus according to the present embodiment, grooves forming light reflection portions 20, which are near LEDs 12a, 12b have a depth set to be $d_1$, and as grooves forming the light reflection portions 20 are remoter from the LEDs 12a, 12b, their depths are larger. At the center of the linear photoconductor 14a, the groove forming the light reflection portions 20 has a depth $d_2$ which is larger than the depth $d_1$.

In the lighting apparatus according to the first to the seventh embodiments, light from the LEDs 12a, 12b can be often hindered from entering those of the light reflection portions 20 remote from the LEDs 12a, 12b, by the rest of the light reflection portions 20.

In contrast to this, in the present embodiment, a width of the planes of the light reflection portions 20 is increased as the planes are remoter from the LEDs 12a, 12b, whereby light can be incident on even those of the light reflection portions 20, which is remote from the LEDs 12a, 12b without being hindered by the rest light reflection portions 20.

[A Tenth Embodiment]

Figure 23:
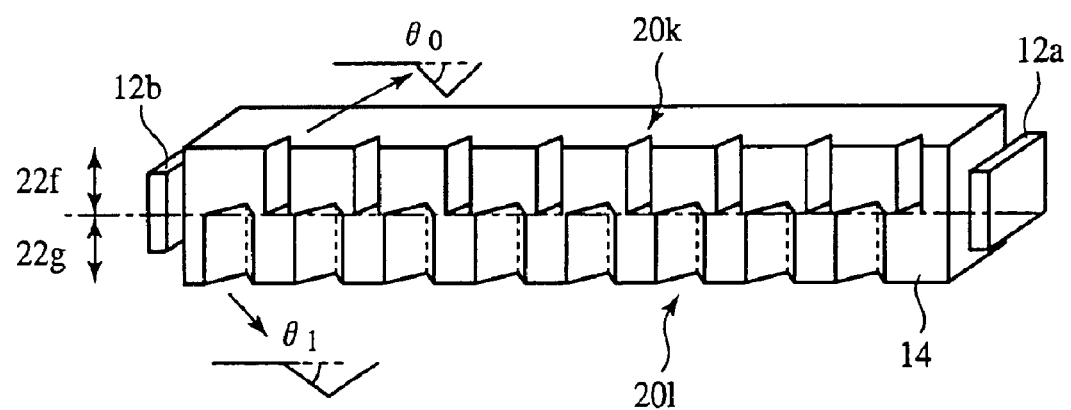
FIG. 23 is a perspective view of the lighting apparatus according to a tenth embodiment of the present invention.

The lighting apparatus according to a tenth embodiment of the present invention will be explained with reference to FIG. 23. FIG. 23 is a perspective view of the lighting apparatus according to the present embodiment. The same member of the present embodiment as those of the lighting apparatus according to the first to the ninth embodiments of the present invention are represented by the same reference numbers not to repeat or to simplify their explanation.

The lighting apparatus according to the present embodiment is characterized mainly in that a region of a linear photoconductor 14 on the reflection side thereof is divided in two stages of an upper and a lower stages, i.e., the linear photoconductor 14 on the reflection side thereof is divided vertically to the longitudinal direction of the linear photoconductor 14, and tilt angles of light reflection portions 20k in the upper region 22f are uniformly set to be $\theta_0$, and tilt angles of light reflection portions 22l in the lower region 22g are uniformly set to be $\theta_1$.

In the lighting apparatus according to the fourth and the fifth embodiments, the linear photoconductor 14 is longitudinally divided in a plurality of regions, but in the present embodiment, the linear photoconductor 14 is divided in a plurality of upper and lower regions, i.e., the linear photoconductor 14 is divided vertically to the longitudinal direction of the linear photoconductor 14.

Even in the case that the linear photoconductor is thus divided vertically in a plurality of regions, a light intensity distribution can be made uniform even when tilt angles of the light reflection portions of the divided regions are set to be uniformly the same.

[An Eleventh Embodiment]

Figure 24:
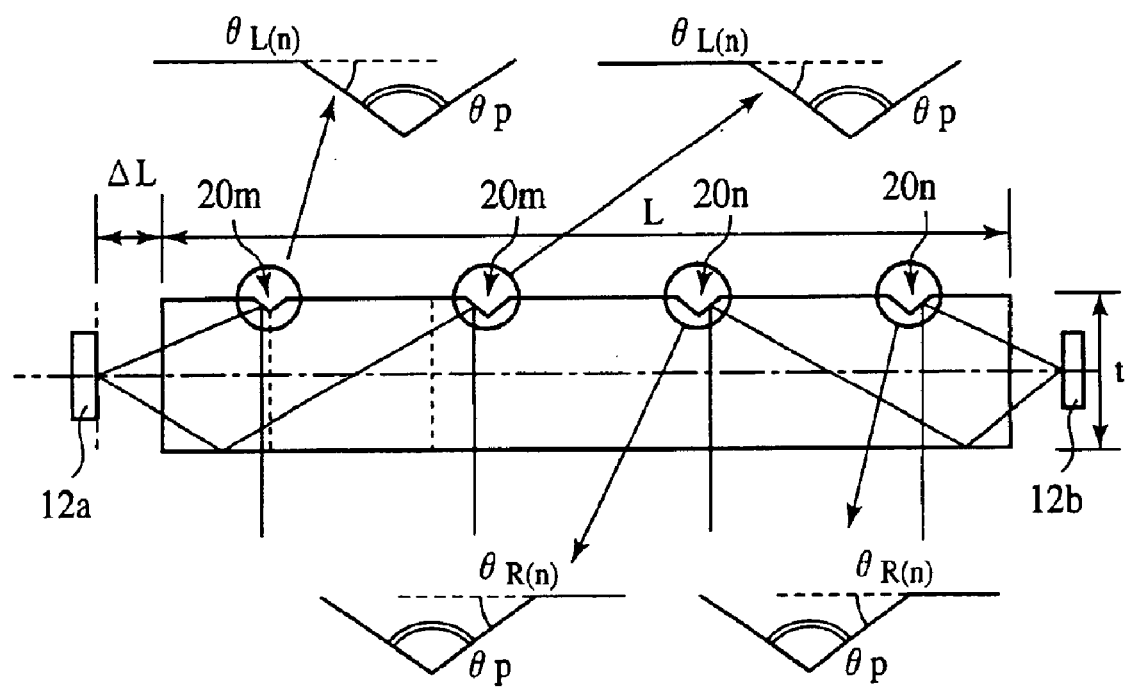
FIG. 24 is a perspective view of the lighting apparatus according to an eleventh embodiment of the present invention.
Figure 25:
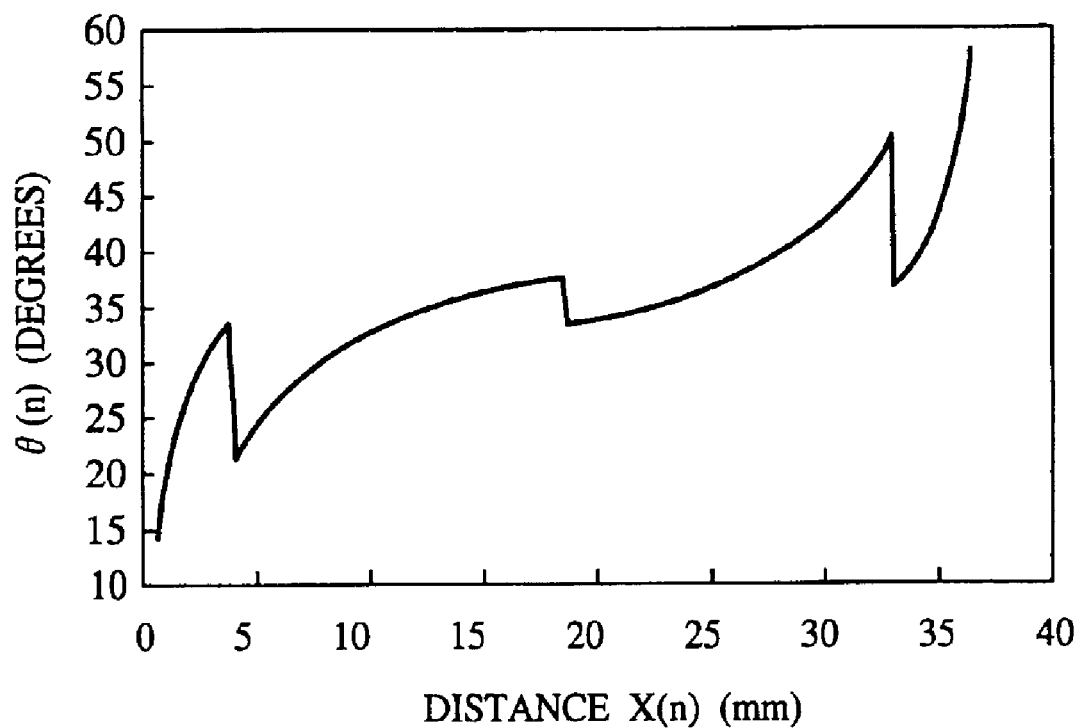
FIG. 25 is a graph of examples of tilt angles of the planes of the light reflection portions of the lighting apparatus according to the eleventh embodiment of the present invention.

The lighting apparatus according to an eleventh embodiment of the present invention will be explained with reference to FIGS. 24 and 25. FIG. 24 is a perspective view of the lighting apparatus according to the present embodiment. FIG. 25 is a graph of examples tilt angles of the planes of the right reflection portions of the lighting apparatus according to the present embodiment. The same members of the present embodiment as those of the lighting apparatus according to the first to the tenth embodiments are represented by the same reference numbers not to repeat or to simplify their explanation.

The lighting apparatus according to the present embodiment is characterized mainly in that V-shaped grooves forming light reflection portions 20m, 20n have the same configuration, and the light reflection portions 20m disposed on the left side of the center of a linear photoconductor 14 as viewed in the drawing have the planes on the left side as viewed in the drawing set at a tilt angle $\theta_L(n)$ so that light emitted by an LED 12a disposed on the left side as viewed in the drawing exit vertically to the longitudinal direction of the linear photoconductor 14, and the light reflection portions 20n disposed on the right side of the center of the linear photoconductor 14 as viewed in the drawing have the planes on the right side as viewed in the drawing set at a tilt angle $\theta_R(n)$ so that light emitted by an LED 12b disposed on the right side as viewed in the drawing exit vertically to the longitudinal direction of the linear photoconductor 14.

Large numbers of the light reflection portion 20m and of the light reflection portion 20n are formed on the reflection side of the linear photoconductor 14, but almost all of them are not shown in FIG. 24.

As shown in FIG. 24, the light reflection portions 20m formed on the left side of the center of the linear photoconductor 14 as viewed in the drawing have the planes on the left side as viewed in the drawing set at a tilt angle $\theta_L(n)$ so that light emitted by the LED 12a disposed on the left side as viewed in the drawing is reflected on the planes on the left side, as view in the drawing, of the light reflection portions 20m and exits vertically to the longitudinal direction of the linear photoconductor 14.

A tilt angle $\theta_L(n)$ of the planes of the light reflection portions 20m on the left side as viewed in the drawing may be set by, e.g., the above-described Formula 2 or Formula 4. In this case, the end surface of the linear photoconductor 14 on the left side as viewed in the drawing is the standard for a distance X(n).

On the other hand, as shown in FIG. 24, the light reflection portions 20n formed on the right side of the center of the linear photoconductor 14 as viewed in the drawing have the planes on the right side as viewed in the drawing set at a tilt angle $\theta_R(n)$ so that light emitted by the LED 12b disposed on the right side as viewed in the drawing is reflected on the planes of the right side, as viewed in the drawing, of the light reflection portions 20n and exits vertically to the longitudinal direction of the linear photoconductor 14.

A tilt angle $\theta_R(n)$ of the planes of the light reflection portions 20n on the right side as viewed in the drawing may be set by, e.g., the above-described Formula 2 or Formula 4. In this case, the end surface of the linear photoconductor 14 on the right side as viewed in the drawing is the standard for a distance X(n).

Angles $\theta_P$ formed by the planes of the V-shaped grooves forming the light reflection portions 20m, 20n are the same.

In the present embodiment, included angles $\theta_P$ formed by the planes of the V-shaped grooves forming the light reflection portions are the same. A tilt angle of the planes on the right side, as viewed in the drawing, of the light reflection portions 20m is an angle given by subtracting a tilt angle $\theta_L$(n) and an included angle $\theta_P$ from 180 degrees. Accordingly, light incident on the planes on the right side of the light reflection portions 20m as viewed in the drawing from the LED 12b does not always exit vertically to the longitudinal direction of the linear photoconductor 14.

However, without any special problem, light emitted by the LED 12b is reflected on the planes on the right side, as viewed in the drawing, of the light reflection portions 20n and exits vertically to the longitudinal direction of the linear photoconductor 14.

In the present embodiment, because included angles $\theta_P$ of the planes of the V-shaped grooves forming the light reflection portions are set to be the same, a tilt angle of the planes on the left side, as viewed in the drawing, of the light reflection portions 20n is an angle given by subtracting a tilt angle $\theta_R$(n) and an included angle $\theta_P$ from 180 degrees. Thus, light incident on the planes on the left side, as viewed in the drawing, of the light reflection portions 20n does not always exit vertically to the longitudinal direction of the linear photoconductor 14.

However, without any special problem, light incident from the LED 12a is reflected on the planes on the left side, as viewed in the drawing, of the light reflection portions 20m and exit vertically to the longitudinal direction of the linear photoconductor 14.

Then, examples of set values of the tilt angles of the planes of the light reflection portions of the lighting apparatus according to the present embodiment will be explained with reference to FIG. 25. FIG. 25 is a graph of the examples of tilt angles of the light reflection portions, given by the above-described formula. Distances X(n) from the end surfaces of the linear photoconductor and the light reflection portions are taken on the horizontal axis. Title angles of the planes of the light reflection portions are taken on the vertical axis.

The tilt angles were calculated under the conditions that a display size was 2 inches, a display screen width was 35 mm, a number of the light reflection portions 20 was 170, a pitch of the light reflection portions 20 was 0.21 mm, a thickness t of the linear photoconductor 14 was 3 mm, a length L of the linear photoconductor 14 was 37 mm, a distance ΔL between the LEDs 12a, 12b and the linear photoconductor 14 was 0 mm, a refractive index of the linear photoconductor 14 was 1.51, and a distance between the watching human eyes and the display screen was 350 mm.

According to the present embodiment, the V-shaped grooves forming the light reflection portions 20m, 20n have the same configuration. Accordingly, one kind of cutting tool for forming a cast, etc. for casting the linear photoconductor 14 can be used. Thus, according to the present embodiment, the cast, etc. for casting the linear photoconductor 14 can be formed at low costs, which makes it possible to provide at low costs the lighting apparatus which can provide a uniform light intensity distribution.

[A Twelfth Embodiment]

Figure 26:
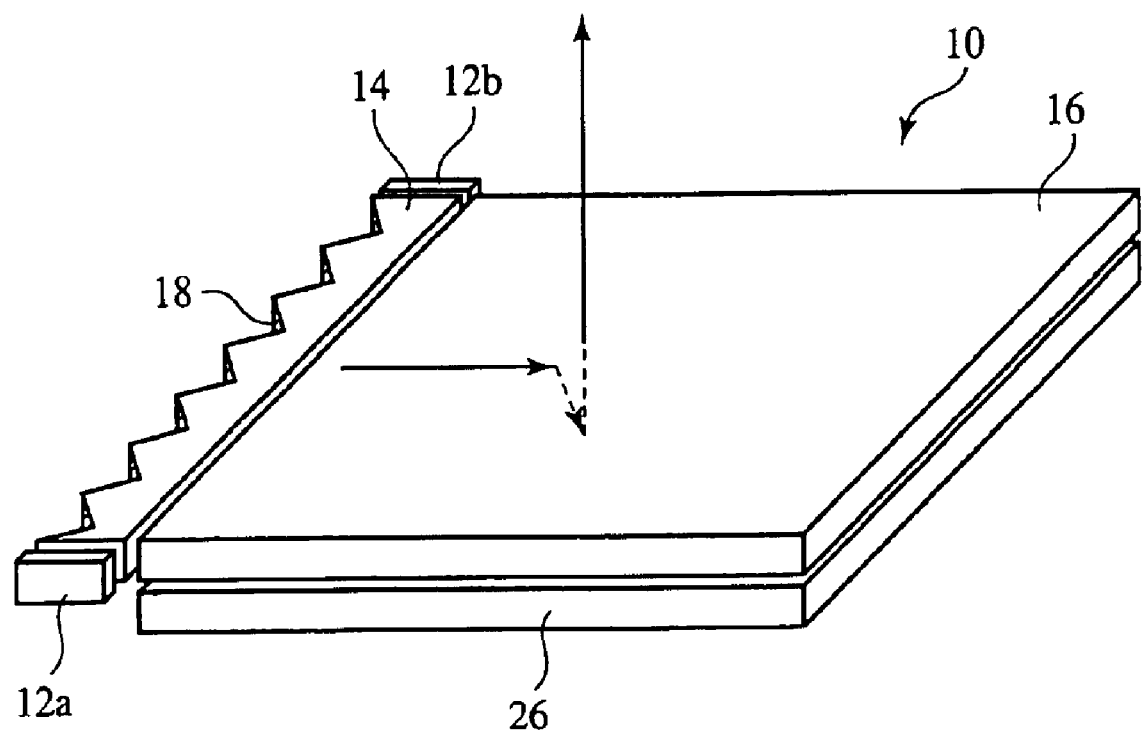
FIG. 26 is a perspective view of the liquid crystal display according to a twelfth embodiment of the present invention.

The liquid crystal display according to a twelfth embodiment of the present invention will be explained with reference to FIG. 26. FIG. 26 is a perspective view of the liquid crystal display according tot he present embodiment. The same members of the present embodiment as those of the lighting apparatus according to the first to the eleventh embodiments are represented by the same reference numbers not to repeat or to simplify their explanation.

The liquid crystal display according to the present embodiment comprises a combination of the lighting apparatus according to any one of the first to the eleventh embodiments, and a reflection-type liquid crystal panel.

As shown in FIG. 26, the lighting apparatus 10 according to any one of the first to the eleventh embodiments is provided on a reflection-type liquid crystal panel 26.

Light exiting from the linear photoconductor 14 of the lighting apparatus 10 is incident on the reflection-type liquid crystal panel 26 via the surface photoconductor 16, is reflected on a mirror (not shown) disposed in the reflection-type liquid crystal panel 26, and is watched by the human eyes. In the present embodiment, the lighting apparatus 10 functions as a front light.

According to the present embodiment, the liquid crystal display uses the lighting apparatus according to any one of the first to the eleventh embodiments, whereby the reflection-type liquid crystal panel can be lighted with a uniform light intensity. Accordingly, the liquid crystal display according to the present embodiment can have good display characteristics.

[A Thirteenth Embodiment]

Figure 27:
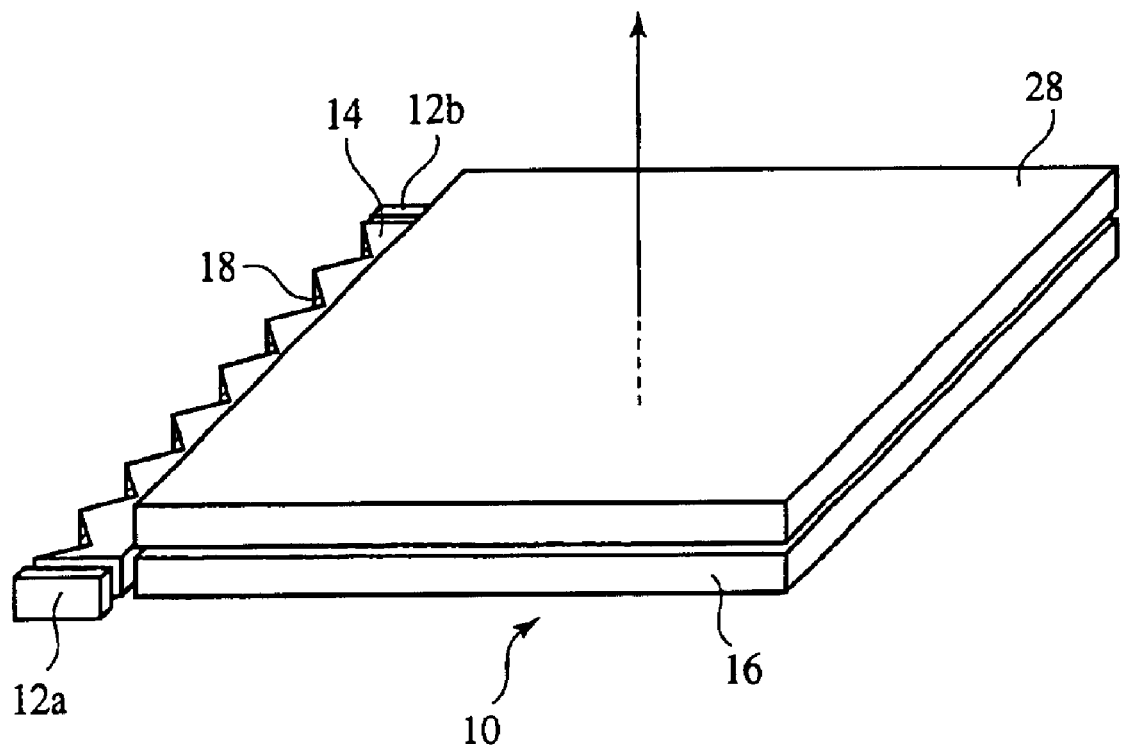
FIG. 27 is a perspective view of the liquid crystal display according to a thirteenth embodiment of the present invention.
Figure 28A:
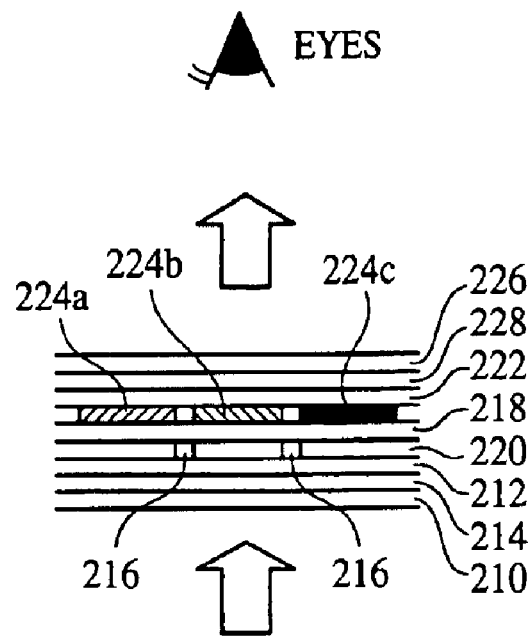
FIG. 28A is a sectional view of a transmission-type liquid crystal panel.
Figure 28B:
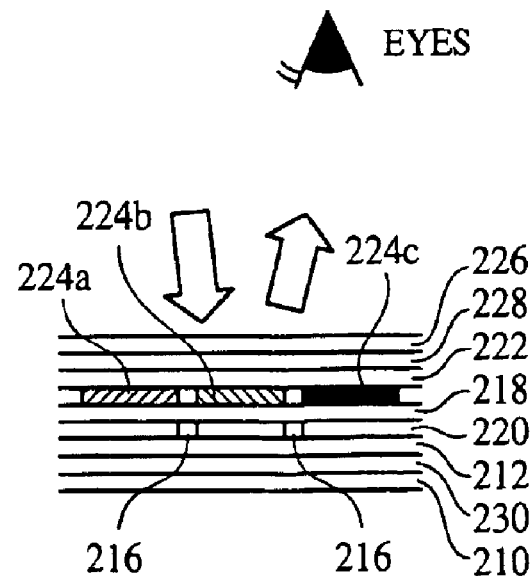
FIG. 28B is a sectional view of a reflection-type liquid crystal panel.

The liquid crystal display according to a thirteenth embodiment of the present invention will be explained with reference to FIG. 27. FIG. 27 is a perspective view of the liquid crystal display according to the present embodiment. The same members of the present embodiment as those of the lighting, etc. according to the first to the twelfth embodiments are represented by the same reference numbers not to repeat or to simplify their explanation.

The liquid crystal display according to the present embodiment comprises a combination of the lighting apparatus according to any one of the first to the eleventh embodiments, and a transmission-type liquid crystal panel.

As shown in FIG. 27, a transmission-type liquid crystal panel 26 is provided on the lighting apparatus 10 according to any one of the first to the eleventh embodiments.

Light exiting from the linear photoconductor 14 is incident on the transmission-type liquid crystal panel 28 via the surface photoconductor 16, transmitted by the transmission-type liquid crystal panel 28, and watched by the human eyes.

As described above, according to the present embodiment, the liquid crystal display using the transmission-type liquid crystal panel can provide good display characteristics.

[Modifications]

The present invention is not limited to the above-described embodiments and can cover other various modifications.

For example, in the tenth embodiment, the linear photoconductor is divided in an upper and a lower regions, two regions. However, the linear photoconductor may be divided in more regions, whereby further uniform light intensity distributions can be obtained. However, as more regions are provided, a larger number of set angles of light reflection portions are required. Accordingly, it is preferable to set a suitable number of regions in consideration of a required uniform light intensity distribution and allowable costs.

What is claimed is:

1. A lighting apparatus comprising a light source for emitting light, a linear photoconductor for reflecting the light incident on a plurality of light reflection portions formed on a reflection side from the light source, and causing the light to exit linearly from an exit side opposed to the reflection side, and a planar photoconductor optically coupled to the linear photoconductor, for causing the light entering from the linear photoconductor to exit in plane, the light emitted by the light source being introduced into the linear photoconductor through the end of the linear photoconductor, planes of the plural light reflection portions being respectively tilted at a plurality of different angles according to the positions of the light reflection portions so that the light emitted from the planar photoconductor is converged on a viewpoint.

2. A lighting apparatus comprising a light source for emitting light, a linear photoconductor for reflecting the light incident on a plurality of light reflection portions formed on a reflection side from the light source, and causing the light to exit linearly from an exit side opposed to the reflection side, and a planar photoconductor optically coupled to the linear photoconductor, for causing the light entering from the linear photoconductor to exit in plane, the light emitted by the light source being introduced into the linear photoconductor through the end of the linear photoconductor, planes of the plural light reflection portions being respectively tilted at a plurality of different angles according to the positions of the light reflection portions so that the light exits substantially vertically to the longitudinal direction of the linear photoconductor, a direction of the light emitted from the planar photoconductor being substantially perpendicular to a plane of the planar photoconductor.

3. A lighting apparatus according to claim 1, wherein the plural light reflection portions are the same V-shaped grooves, one planes of which are the planes of the light reflection portions.

4. A lighting apparatus according to claim 2, wherein the plural light reflection portions are the same V-shaped grooves, one planes of which are the planes of the light reflection portions.

5. A lighting apparatus according to claim 1, wherein the linear photoconductor is longitudinally divided in plural regions; and in each divided region, the planes of the plural light reflection portions are tilted at the same angle.

6. A lighting apparatus according to claim 2, wherein the linear photoconductor is longitudinally divided in plural regions; and in each divided region, the planes of the plural light reflection portions are tilted at the same angle.

7. A lighting apparatus according to claim 5, wherein the planes of the plural light reflection portions are tilted at the same angles in a region containing the center of the linear photoconductor and in the regions near the ends of the linear photoconductor.

8. A lighting apparatus according to claim 6, wherein the planes of the plural light reflection portions are tilted at the same angles in a region containing the center of the linear photoconductor and in the regions near the ends of the linear photoconductor.

9. A lighting apparatus according to claim 5, wherein in a first longitudinally divided region of the linear photoconductor, the planes of the light reflection portions are tilted equally at a first angle;

in a second region adjacent to the first region, the planes of the light reflection portions are tilted equally at a second angle which is different from the first angle; and in a region near the border between the first region and the second region, the light reflection portions having the planes tilted at the first angle and the light reflection portions having the planes tilted at the second angle are mixed.

10. A lighting apparatus according to claim 6, wherein in a first longitudinally divided region of the linear photoconductor, the planes of the light reflection portions are tilted equally at a first angle;

in a second region adjacent to the first region, the planes of the light reflection portions are tilted equally at a second angle which is different from the first angle; and in a region near the border between the first region and the second region, the light reflection portions having the planes tilted at the first angle and the light reflection portions having the planes tilted at the second angle are mixed.

11. A lighting apparatus according to claim 1, wherein the linear photoconductor is divided in a plurality of regions vertically to the longitudinal direction; and in each divided region, the planes of the plural light reflection portions are tilted at the same angle.

12. A lighting apparatus according to claim 2, wherein the linear photoconductor is divided in a plurality of regions vertically to the longitudinal direction; and in each divided region, the planes of the plural light reflection portions are tilted at the same angle.

13. A lighting apparatus according to claim 1, wherein the light reflection portions are extended obliquely to the longitudinal direction of the linear photoconductor.

14. A lighting apparatus according to claim 2, wherein the light reflection portions are extended obliquely to the longitudinal direction of the linear photoconductor.

15. A lighting apparatus according to claim 1, wherein the planes of the plural light reflection portions are respectively tilted at the different angles according to the positions of the light reflection portions so that the light emitted substantially from the center of the light source is converged to the viewpoint.

16. A lighting apparatus according to claim 2, wherein the planes of the plural light reflection portions are respectively tilted at angles which cause the light emitted substantially from the center of the light source to exit substantially vertically to the longitudinal direction of the linear photoconductor.

17. A lighting apparatus according to claim 1, wherein the reflection side of the linear photoconductor is curved.

18. A lighting apparatus according to claim 2, wherein the reflection side of the linear photoconductor is curved.

19. A lighting apparatus according to claim 1, wherein a width of one set of planes of the light reflection portions, and a width of another set of planes of the light reflection portions are different from each other.

20. A lighting apparatus according to claim 2, wherein a width of one set of planes of the light reflection portions, and a width of another set of planes of the light reflection portions are different from each other.

21. A lighting apparatus according to claim 1, wherein a reflection coat film is further formed on the reflection side of the linear photoconductor.

22. A lighting apparatus according to claim 2, wherein
a reflection coat film is further formed on the reflection side of the linear photoconductor.

23. A lighting apparatus according to claim 1, further comprising
reflection means provided on the reflection side of the linear photoconductor separately from the linear photoconductor.

24. A lighting apparatus according to claim 2, further comprising
reflection means provided on the reflection side of the linear photoconductor separately from the linear photoconductor.

25. A lighting apparatus according to claim 1, wherein the linear photoconductor is formed substantially in a square pole.

26. A lighting apparatus according to claim 2, wherein the linear photoconductor is formed substantially in a square pole.

27. A liquid crystal display comprising a lighting apparatus including a light source for emitting light, a linear photoconductor for reflecting light incident on a plurality of light reflection portions formed on a reflection side from the light source and causing the light to exit linearly from an exit side opposed to the reflection side, and a planar photoconductor optically coupled to the linear photoconductor and causing the light entering from the linear photoconductor to exit in plane; and a liquid crystal panel illuminated by the lighting apparatus, the light emitted by the light source being introduced into the linear photoconductor through the end of the linear photoconductor, planes of the plural light reflection portions being respectively tilted at a plurality of different angles according to the positions of the light reflection portions so that the light emitted from the planar photoconductor is converged on a viewpoint.

28. A liquid crystal display comprising a lighting apparatus including a light source for emitting light, a linear photoconductor for reflecting light incident on a plurality of light reflection portions formed on a reflection side from the light source and causing the light to exit linearly from an exit side opposed to the reflection side, and a planar photoconductor optically coupled to the linear photoconductor and causing the light entering from the linear photoconductor to exit in plane; and a liquid crystal panel illuminated by the lighting apparatus, the light emitted by the light source being introduced into the linear photoconductor through the end of the linear photoconductor, planes of the plural light reflection portions being respectively tilted at a plurality of different angles according to the positions of the light reflection portions so that the light exits substantially vertically to the longitudinal direction of the linear photoconductor, a direction of the light emitted from the planar photoconductor being substantially perpendicular to a plane of the planar photoconductor.

* * * * *